United States Patent [19]
Dunkerton et al.

[11] Patent Number: 4,642,633
[45] Date of Patent: Feb. 10, 1987

[54] INDIVIDUAL SIMULCAST STATION CONTROL SYSTEM

[75] Inventors: Stephen H. Dunkerton, Riverwoods, Ill.; Gary R. Reynolds, Twin Falls, Id.; Scott G. Chapman, Schaumburg; Gary D. Erickson, Mt. Prospect, both of Ill.

[73] Assignee: Motorola, Inc., Schaumburg, Ill.

[21] Appl. No.: 520,790

[22] Filed: Aug. 5, 1983

[51] Int. Cl.$^4$ .................... H04B 7/00; H04Q 7/00
[52] U.S. Cl. .................... 340/825.76; 340/825.48; 455/36; 455/56
[58] Field of Search .............. 340/825.03, 825.07, 340/825.04, 825.44, 825.48, 825.53, 825.69, 311.1, 825.47, 825.52, 825.76, 825.71; 455/69, 33–38, 53, 56, 68, 70, 58; 179/2 EC; 375/3, 69

[56] References Cited

U.S. PATENT DOCUMENTS

| | | | |
|---|---|---|---|
| 4,131,849 | 12/1978 | Freeburg et al. | 455/58 |
| 4,199,761 | 4/1980 | Whyte et al. | 455/68 |
| 4,423,416 | 12/1983 | Bailey et al. | 340/825.44 |
| 4,449,248 | 5/1984 | Leslie et al. | 455/53 |
| 4,516,269 | 5/1985 | Krinock | 455/56 |
| 4,550,443 | 10/1985 | Freeburg | 455/56 |
| 4,554,542 | 11/1985 | Dolikian | 340/825.76 |

FOREIGN PATENT DOCUMENTS

2044503 10/1980 United Kingdom ............... 455/53

*Primary Examiner*—Donald J. Yusko
*Attorney, Agent, or Firm*—Joseph T. Downey; Anthony B. Sarli; Winfield J. Brown, Jr.

[57] ABSTRACT

A simulcast paging transmitter remote control system capable of individual station control is described. The remote paging transmitter control system comprises an encoder and decoder which interface with a paging terminal and transmitter respectively. The system encoder and decoder communicate through a specifically formatted signalling scheme which is configured to provide station deactivation information as well as conventional paging information.

7 Claims, 47 Drawing Figures

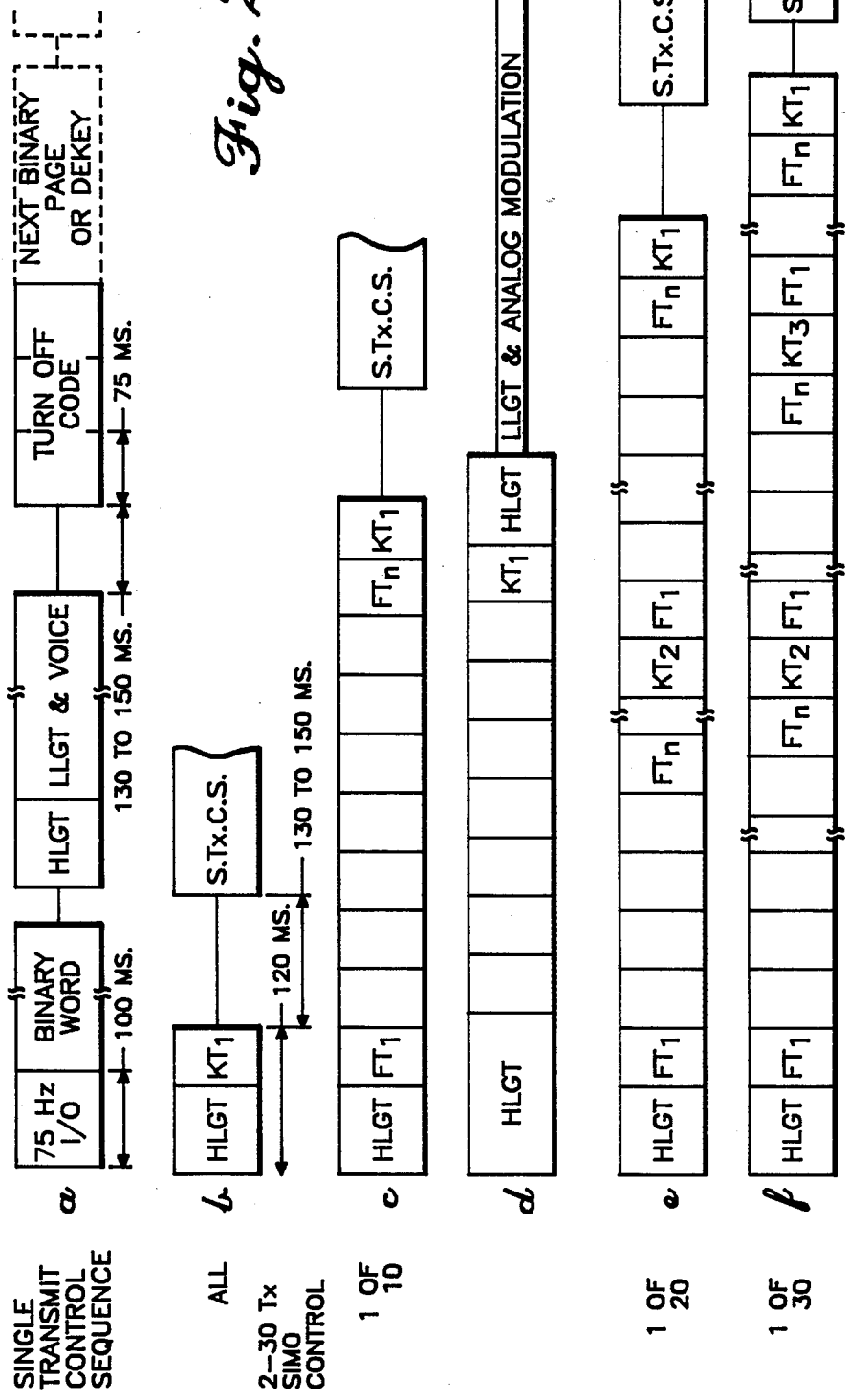

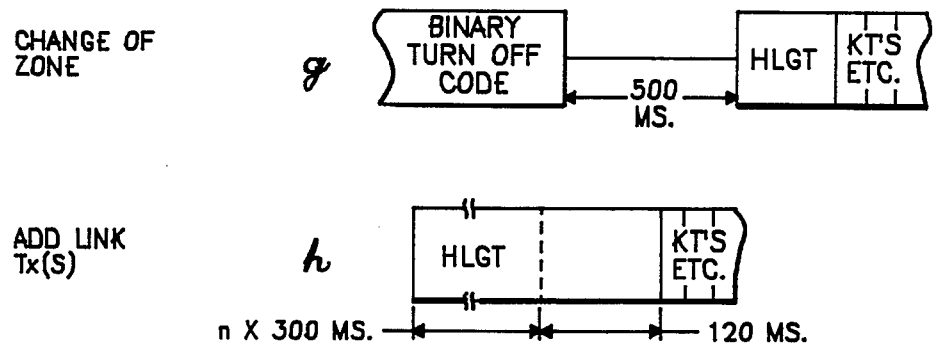
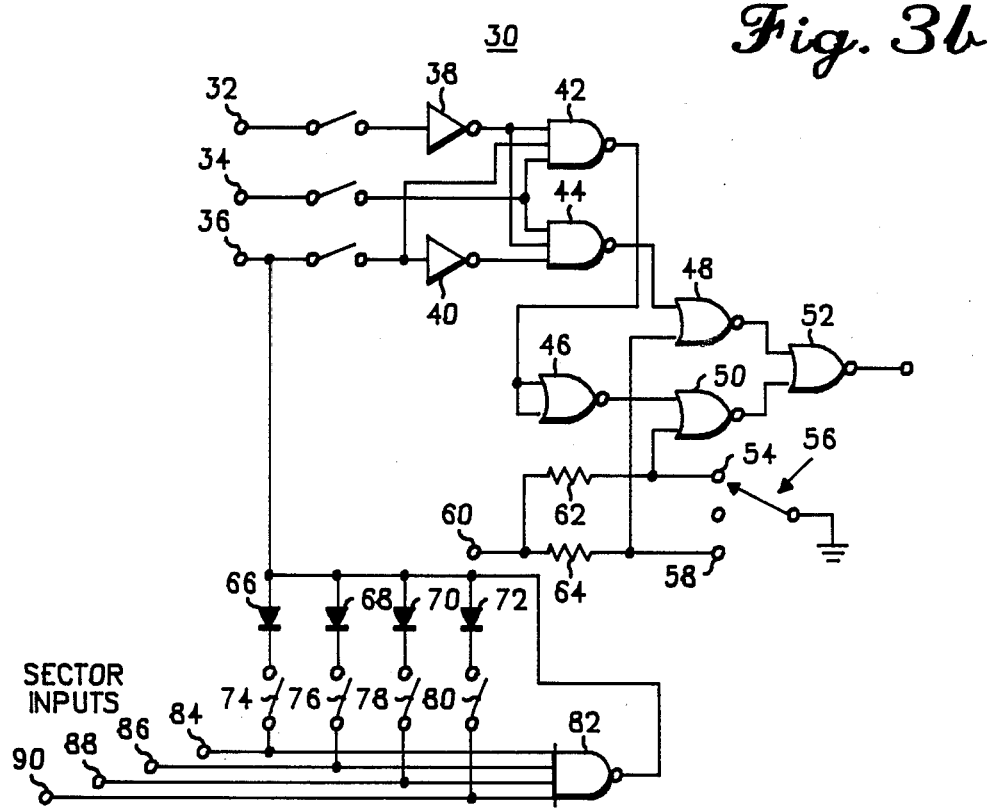

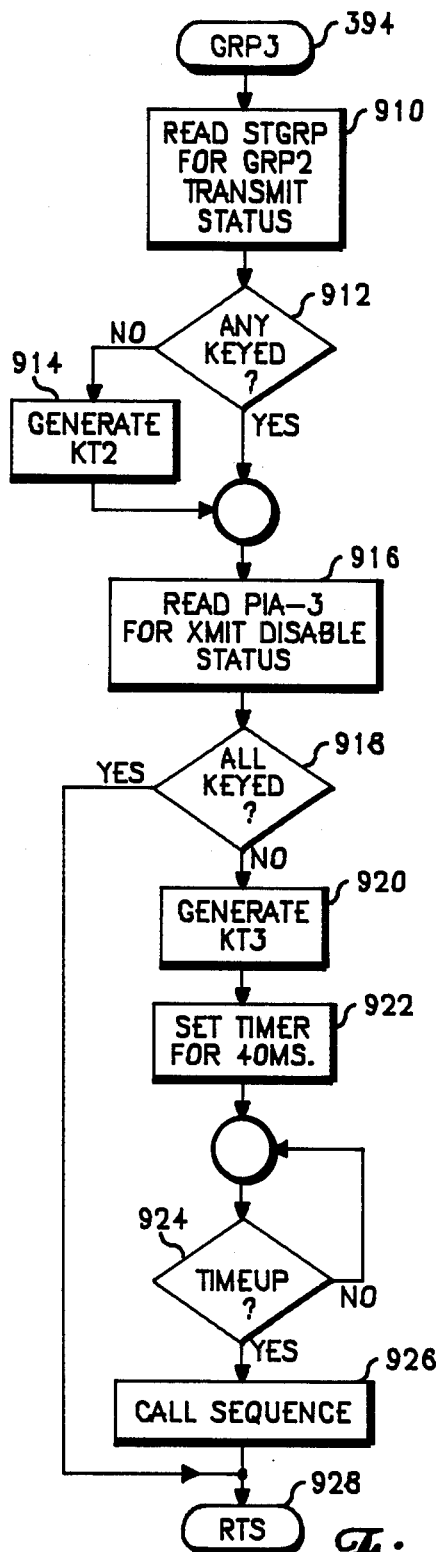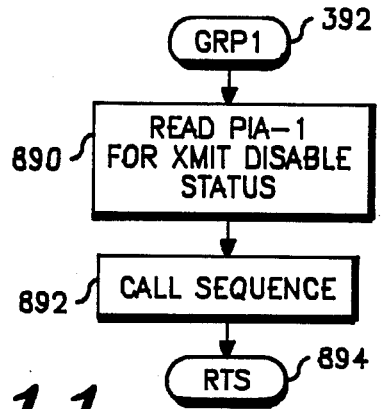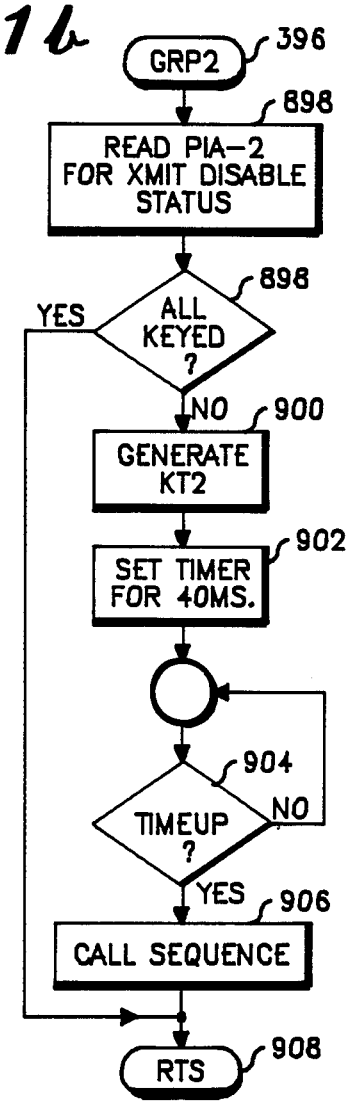
Fig. 11a
Fig. 11b
Fig. 11c

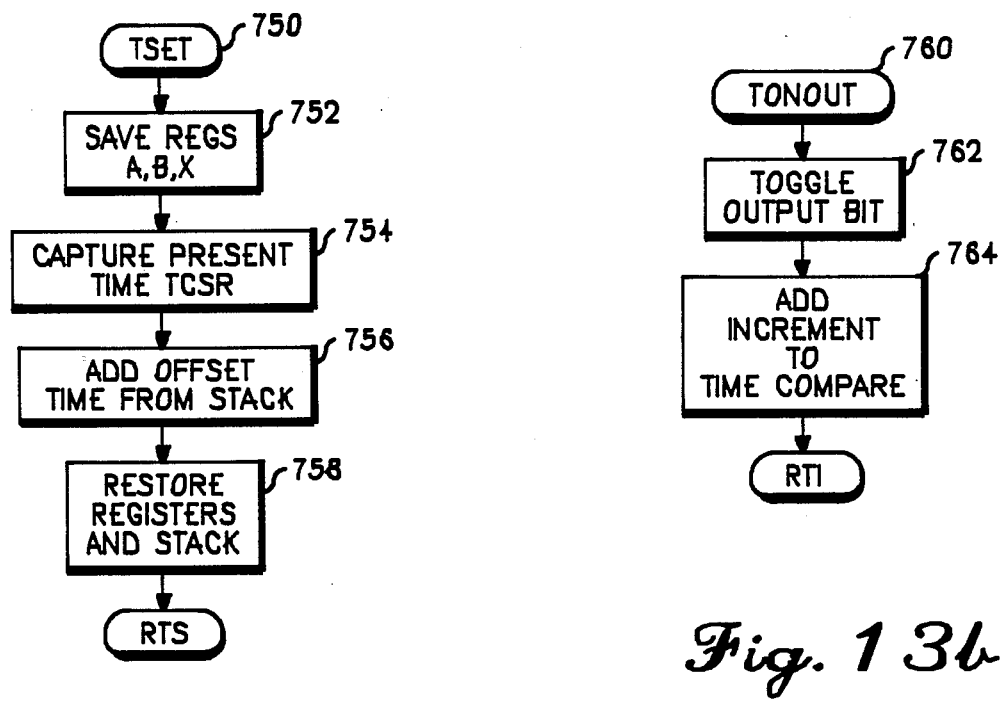
*Fig. 13a*
*Fig. 13b*
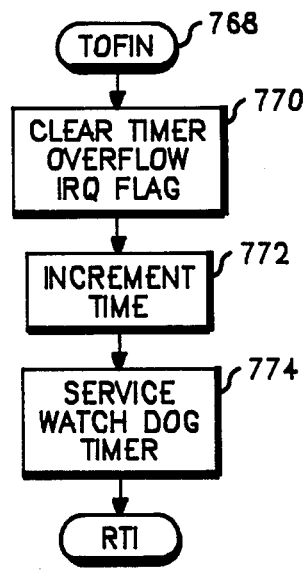
*Fig. 13c*

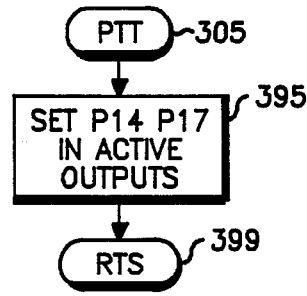
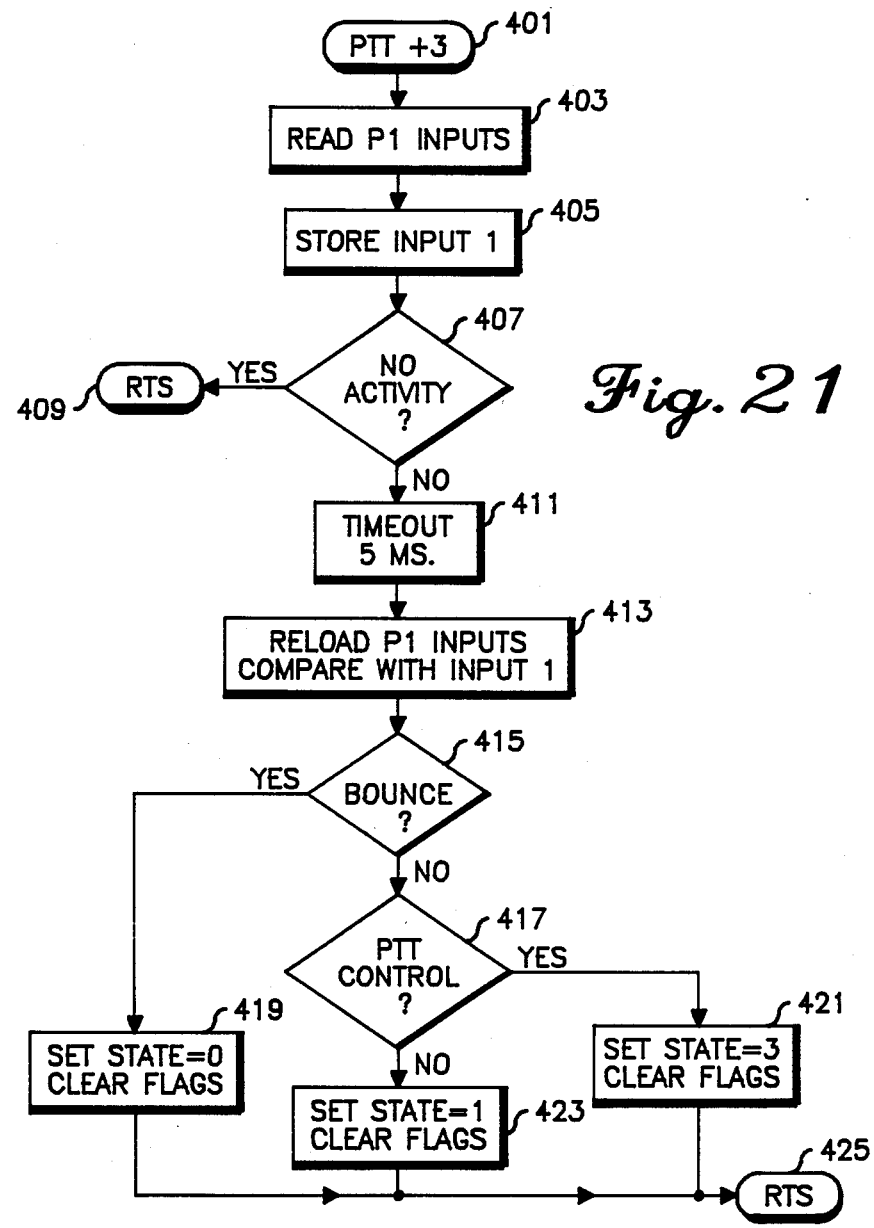
Fig. 20
Fig. 21

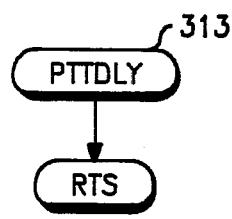
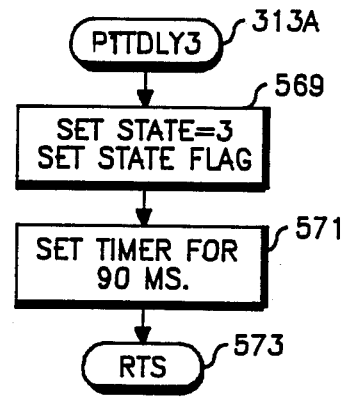
Fig. 26a
Fig. 26b
Fig. 27a
Fig. 27b
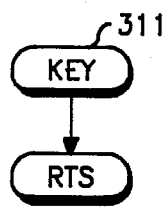
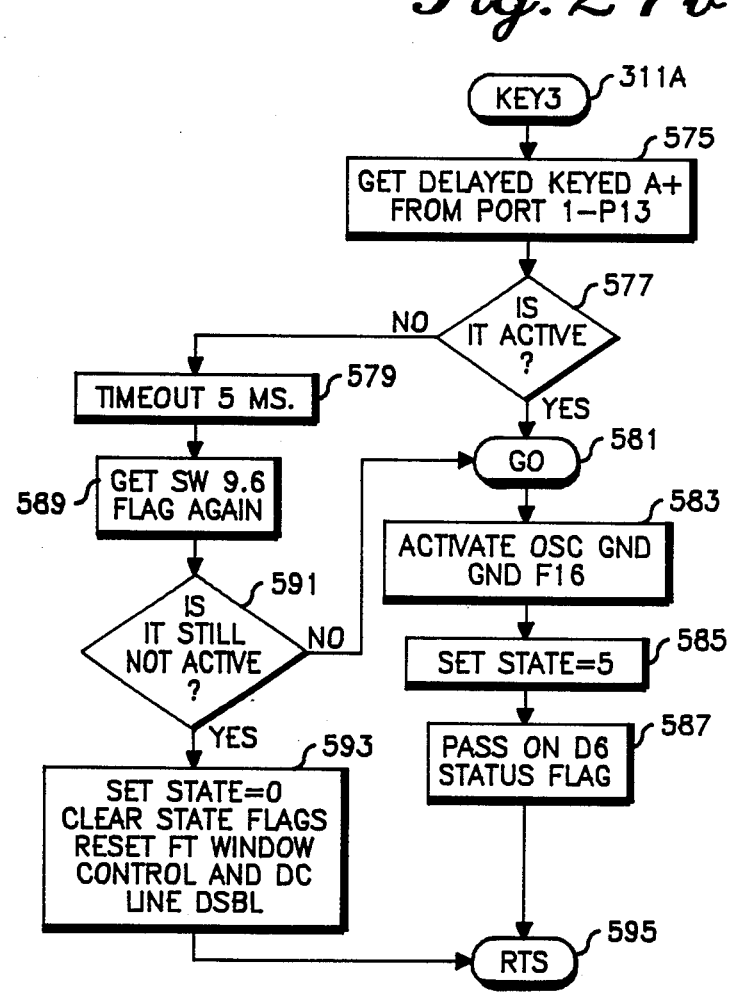

INDIVIDUAL SIMULCAST STATION CONTROL SYSTEM

BACKGROUND OF THE INVENTION

This invention relates to the field of paging simulcast transmission systems and specifically to a simulcast transmission system in which each individual simulcast transmitter in the system can be individually activated or "knocked down" in response to a signal from a paging terminal or central controller.

In the past simulcast transmission systems have incorporated transmitting stations which remained activated while the simulcast system was in use. Individual remote station control systems have not been developed with efficient signalling schemes.

Wide area coverage systems employing multiple transmitters on the same RF channel are gaining wider acceptance due in part to the growth of personal paging activity. Simulcast transmission systems require that each transmitter in the system produce a signal of substantially identical frequency and modulation. This requires that the transmitting stations in a simulcast system be periodically adjusted so that critical system parameters are satisfied. One method of calibrating a simulcast transmission system is to selectively deactivate certain transmitters in the system while active transmitters are adjusted. In a typical prior art simulcast transmission system, service personnel would be stationed at each individual transmitter location, and would communicate through a separate telephone line or RF channel while manually activating and deactivating remote simulcast transmitters to effect the calibration procedure. Prior art simulcast systems have not included any means for individually, efficiently and remotely controlling simulcast transmitters through a conventional simulcast system link.

In addition, individual simulcast transmitter control is useful in a simulcast system which is designed to generate multiple signalling schemes. A simulcast transmitter which can generate both binary and analog signalling formats, can be configured for individual station control and provide a truly universal paging system with controllable area coverage. For instance, simulcast system would typically be configured to provide wide area coverage in a certain area. However, paging subscriber may desire service in only a portion of the total available area, for instance at a large construction site in a certain sector of a city. A simulcast transmission system with individual station control can provide service to the limited area subscriber without requiring the subscriber to pay a fee based on broad area coverage. In other words, another benefit of individual station control is the ability to sector paging coverage based on different tariff structures.

SUMMARY OF THE INVENTION

Briefly described, the present invention contemplates a paging remote control system which comprises an encoder and decoder which interface with a paging terminal and transmitter, respectively. The system encoder generates a series of tones and timed pauses in response to signals generated by a paging terminal and by a series of programmable switches located within the system encoder. The programmable switches within the system provide sector information utilized in generating the signalling scheme.

The paging system encoder then generates signals in accordance with the signalling scheme. The signals are formatted to instruct specific paging stations within the paging simulcast system to transmit or not transmit as instructed by the paging system encoder.

According to the signalling scheme of the present invention, the paging system encoder will generate a high level guard tone signal which instructs the remote simulcast transmitters that paging signal is imminent. The paging system encoder then generates a group of up to 10 function tones to instruct individual simulcast transmitter station that they should not transmit the subsequent paging signal. The function tone sequence is terminated by the transmission of a keying sequence tone.

The signalling scheme is formatted to be capable of addressing a total of thirty individual simulcast transmitter sites through repeated use of the function tone sequence. Addressing more than ten simulcast transmitters requires that each function tone sequence be delineated by a unique keying sequence tone. Any number of stations up to 30 can be addressed by sending the sequence of high level guard tones followed by function tones delineated keying sequence tones.

Each of the remote paging transmitter sites is equipped with a paging system decoder which has been programmed by user accessible switches to respond to a unique function and keying sequence tone, by selectively actuating or deactuating the paging transmitter. Every paging system decoder will actuate the paging transmitter if its function tone/group tone signal has not been received and the end of sequence tone is received.

It is, therefore, an object of this invention to provide a paging simulcast remote control system and apparatus capable of selectively deactivating any simulcast remote transmitter used in the simulcast system.

It is a further object of the present invention to provide a collapsing signalling scheme where only the specific transmitter disable tones are transmitted.

It is yet another object of the present invention to provide a paging simulcast remote control system which can be interlaced with conventional paging information thereby eliminating the need for additional control lines.

It is still another object of the present invention to provide a paging simulcast remote control system which can be programmed to provide variable sector coverage.

DETAILED DESCRIPTION OF THE DRAWINGS

FIG. 1 is a block diagram of a paging of the type which embody the signalling scheme of the present invention.

FIGS. 2a–h show the signalling scheme which unifies the operation of the encoder and decoder of the present invention.

FIGS. 3a and 3b is an electrical schematic of the encoder which generates the required signalling scheme of the present invention.

FIGS. 4 through 14 are flow diagrams which define the operation of the microcomputer used in the encoder of FIG. 3.

FIG. 17 through 28b are flow diagrams which define the operation of the microcomputer used in the encoder of FIG. 3.

DETAILED DESCRIPTION OF THE PREFERRED EMBODIMENT

Figure 1:
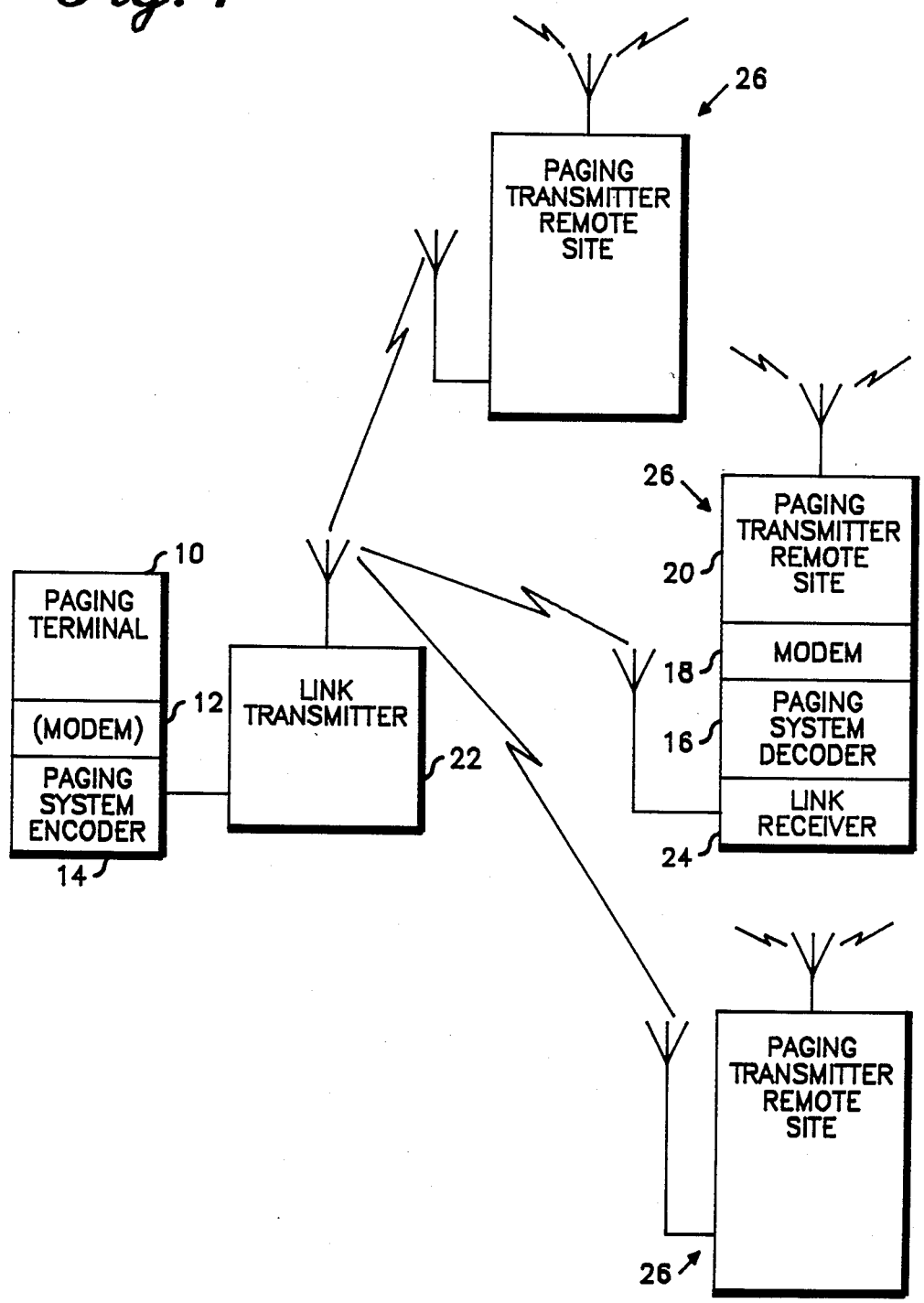

FIG. 1 shows a block diagram of a paging system of the type which embodies the signalling scheme utilized in the present invention. The illustrated paging system includes a paging terminal (10) adapted to provide analog or binary paging signals. The paging terminal interfaces with a modem 12 and a paging system encoder 14. The modem 12 is a conventional device which converts a binary signal from the paging terminal 10 to a frequency-shift keying (FSK) signal used by the station encoder 14. The paging terminal 10 cooperates with the paging system encoder 14 by providing signals to the encoder 14 which indicate that the paging terminal 10 is about to transmit binary or analog signals. The encoder 14 then signals the paging terminal 10 when the encoder is ready to receive either type of signalling. An exact description of the paging terminal and the interface signals required by the paging system encoder are described in Motorola document 68P81063E15 (1982) entitled "Simulcast System Controller and PURC Station Controller" available from the Service Publication Department of Motorola, Inc., 1301 East Algonquin Rd., Schaumburg, Ill., or from Motrorola C & E Parts, 1313 East Algonquin Rd., Schaumburg, Ill.

The encoder 14 then generates a series of tones and timed pauses which are especially formatted and communicated to a paging base station which includes station decoder 16. The paging decoder is described in copending patent assignee of the present invention. The decoder 16 converts the formattred signals from the encoder 14 and selectively activates modem 18 and transmitter 20 in predetermined timed sequences as determined by the signals from the encoder 14. The paging transmitter 20 can then be selectively switched off or turned on in response to the signals received from the encoder 14.

The signalling scheme shown in FIG. 2 has been developed to unify the base station control functions required in paging systems utilizing the individual station control control feature. The signalling scheme shown in FIG. 2 shows a control tone sequence comprising a matrix of function tones inserted between a high level guard tone and one or more keying sequence tones. The matrix of function tones is used to disable undesired stations. The control tones which are sent are determined by sector select programming or individual station control switches connected to the paging system encoder.

Each simulcast transmitter station is assigned a group and disable function tone. The signalling scheme is designed to produce a total of 10 individual function tones and three group or keying sequence tones. The simulcast transmitter decoder is designed to respond to the appropriate keying sequence and function tones. If the appropriate combination of tones is received, the station remains disabled until the system is dekeyed, then any disabled simulcast control modules are reset.

The individual station control scheme is designed to be inserted into a second signalling scheme which allows a paging simulcast transmitter to key in an analog or binary mode. The individual station control scheme begins with the transmission of a high level guard tone signal and terminates with a keying sequence tone. The mode keying control sequence begins with the next control tone. The exact operation of the mode keying signalling scheme is described later in this application and a detailed description is shown in pending U.S. patent application Ser. No. 487,482 entitled Paging Universal Remote Control System by Stephen Dunkerton et al filed Apr. 22, 1983 and assigned to the assignee of the present invention.

The table below shows the function tones associated with each station. Stations 1 through 10 are always associated with group 1, stations 11 through 20 in group 2 and stations 21 through 30 in group 3.

| Station Number | | | Disable FT Frequency |
| --- | --- | --- | --- |
| 1 | 11 | 21 | 1750 Hz |
| 2 | 12 | 22 | 1650 |
| 3 | 13 | 23 | 1550 |
| 4 | 14 | 24 | 1450 |
| 5 | 15 | 25 | 1350 |
| 6 | 16 | 26 | 1250 |
| 7 | 17 | 27 | 1150 |
| 8 | 18 | 28 | 1050 |
| 9 | 19 | 29 | 950 |
| 10 | 20 | 30 | 750 |
| Final Keying Sequence Tone = 1950 Hz | | | |
| Group II Enable = 1850 Hz | | | |
| Group III Enable = 2050 Hz | | | |

Referring now to FIG. 2A, a typical single transmitter control sequence is shown. According to FIG. 2A, a binary paging signal is sent by first sending a first binary pattern of 1's and 0's at a 75 Hz rate for a 100 milliseconds. This pattern is immediately followed by the binary paging signal. An analog signal is transmitted by sending a high level guardtone signal immediately followed by a low level guardtone and voice signal. To terminate the paging sequence, a turn-off code is sent or another binary or analog paging signal could be sent. The signalling scheme of the present invention is inserted prior to the signalling scheme of FIG. 2A for stations equipped for individual station control.

FIG. 2B shows the required signalling of the present invention for a simulcast transmission system utilizing two to thirty transmitters where it is desired that every transmitter in the system transmits the subsequent paging signal. As mentioned earlier, each station is equipped to decode one of ten disabling function tones, as well as one of the three keying sequence tones. Each transmitter is also equipped to decode final keying sequence tone one or 1950 Hz. Therefore, according to FIG. 2B, the individual station control sequence is initiated by sending a high level guardtone signal. Since every station is to transmit, no function tones are sent and the high level guardtone signal is immediately followed by the keying sequence tone which signals the end of the function tone's sequence. After a pause of 120 ms, a single transmission control sequence could be sent.

FIG. 2C shows a tone sequence which will instruct a ten-transmitter system to disable every transmitter, except a single transmitter. The control sequence is initiated by sending a high level guardtone signal followed by a series of function tones with each function code corresponding to a transmitter station to be disabled. The function tone sequence is terminated by a keying sequence tone which is followed by a pause and then a typical single transmission control sequence.

FIG. 2D shows the control sequence required for controlling as many as ten simulcast transmitters when an analog paging signal is the first paging signal to be transmitted.

FIGS. 2A, 2B and 2C have assumed that a single transmitter control sequence begins with a binary page. According to the paging universal remote control scheme described in the above-mentioned patent, a binary page is initiated by a period of pause followed by a 75 Hz signal of binary 1's and 0's as described above. However, if an analog paging signal is to be the first signal transmitted after the simulcast transmitter control sequence, the paging system encoder must follow the last keying sequence tone with a period of high level guardtone which is immediately followed by a low level guardtone and analog modulation signal as shown in FIG. 2D.

FIG. 2E shows the individual station control sequence required when as many as twenty transmitters are to be individually controlled. According to FIG. 2E, the transmitter control sequence is initiated by sending a period of high level guardtone followed by a group of 1 to 10 function tone signals corresponding to group one. The group one function tone sequence is then terminated by the transmission of a group two enable tone. As many as ten function tones can then be sent which are associated with the transmitters configured in group two. The group two function tone sequence is then terminated by the keying sequence tone two which can then be followed by a pause immediately followed by a single transmitter control sequence. If an analog paging mode was desired, keying sequence tone two (KT2) could then be followed by a second high level guardtone signal, and then a low level guardtone accompanied by an analog modulation signal.

FIG. 2F shows the control tone sequence which would be required to control as many as thirty transmitters. According to FIG. 2F, the control tone sequence is initiated by the transmission of a high level guardtone signal immediately followed by the first grouping of function tone signals. The first group of function tone signals is then terminated by the transmission of a first keying sequence tone KT2, which is also a group two enable tone. The next grouping of function tone signals are then sent terminated by a second keying sequence tone KT3. The third grouping of function tone signals can then be sent terminated by a final keying sequence tone (KT1) 1950 Hz which signals the end of the entire keying sequence. The final keying sequence tone can then be followed by a pause and a single transmission control sequence whereby a period of high level guardtone and a subsequent analog paging signal.

FIG. 2G shows the relationship between the time interval required between the last binary paging signal and the first change of transmitter control information. According to FIG. 2G, after the last binary paging signal has been transmitted, the paging encoder must pause for at least 500 ms before retransmitting a high level guard tone signal to allow the paging system decoder to begin searching for the high level guardtone signal.

FIG. 2H shows a relationship between additional transmitter link stations located in the distribution paths of the paging control sequence signal. In order to expand the range of a paging simulcast system, occasionally link transmitters are employed. For every additional link transmitter employed in the paging system, an additional 300 ms period of high level guardtone must be added to the paging transmitter control tone sequence.

Figure 3A:
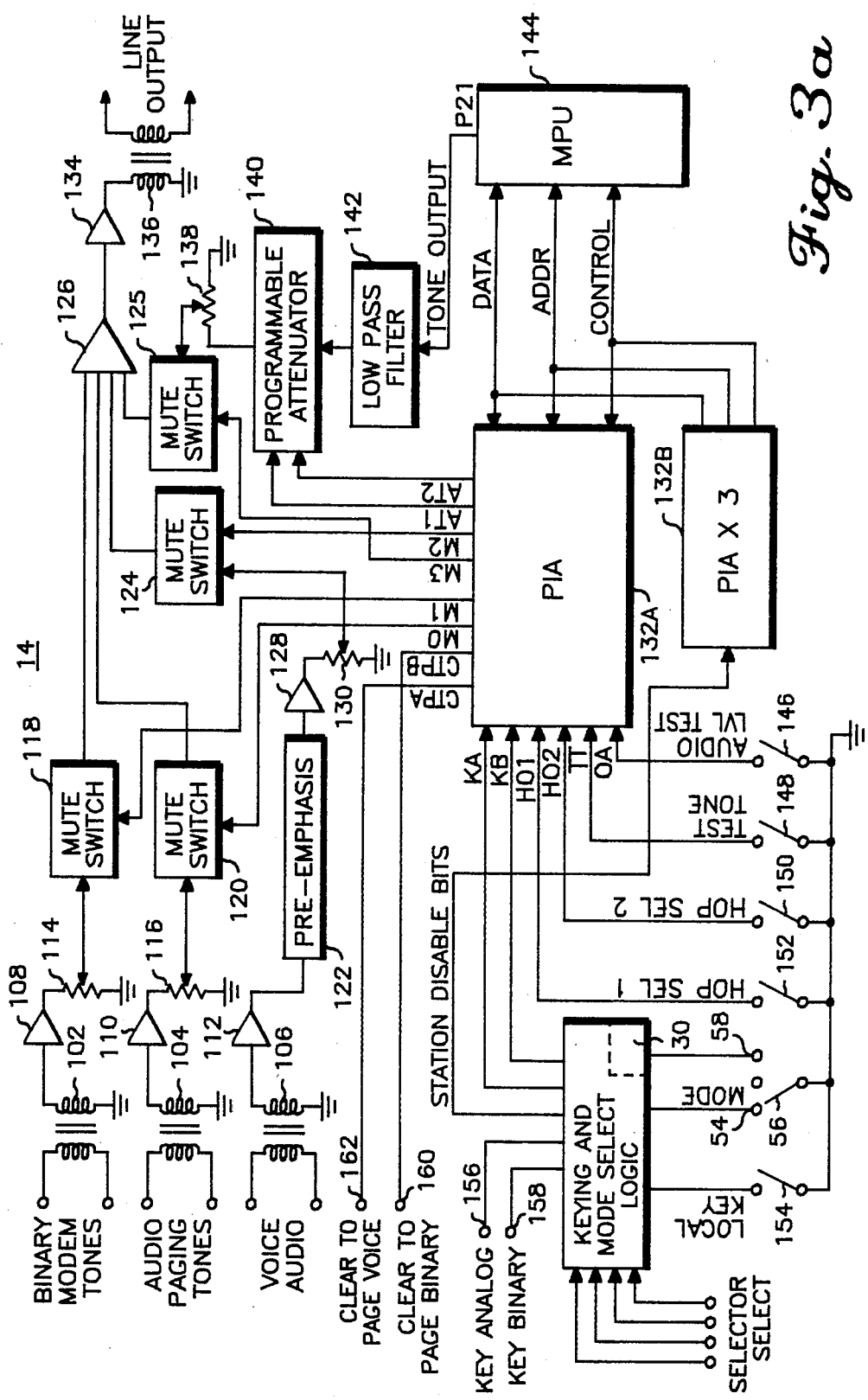

FIG. 3 is an electrical schematic of an encoder which can generate the required signalling scheme of the present invention. A more detailed electrical schematic of the encoder circuit of the present invention is illustrated in Motorola document 68P81063E15 entitled "Simulcast System Controller and PURC Station Controller," available from the Service Publication Department of Motorola, Inc., 1301 East Algonquin Rd., Schaumburg, Ill., or from Motorola C & E Parts, 1313 East Algonquin Rd., Schaumburg, Ill. In accordance with the present invention the various paging output terminals are provided to the respective binary, audio and voice input terminals of the paging system encoder. The signals are interfaced through transformers 102, 104 and 106 respectively, which provide impedance matching end isolation between the paging terminal and the paging system encoder. The transformers 102, 104 and 106 are then connected to buffer amplifiers 108, 110 and 112 which compensate for gain losses in the binary modem tones, paging tone and voice audio signals. The amplifiers 108 and 110 are connected to variable resistors 114 and 116 which provide further compensation between the various paging signals. It is desirable to adjust the binary modem tone, audio paging tones and voice audio tones so they are substantially equal in amplitude when they are connected to summing amplifier 126. The amplifier 112 is connected to a premphasis network 122 which conditions the voice audio signal and provides a standard frequency shaping used to transmit paging voice audio to remote paging transmitters. The premphasis network is then coupled to an amplifier 128 and a variable resistor 130 to compensate for gain variations in this signal path. The amplifier 128 also includes a notch filter to remove the guard tone frequency. The variable resistors 114, 116 and 130 are then coupled to electronic mute switches 118, 120 and 124. Mute switches 118, 120 and 124 can be any type electronic switch adapted to pass an electrical signal in response to an electrical control signal. The mute switches 118, 120 and 124 are coupled to a peripheral interface adaptor circuit (PIA) 132A.

The outputs of mute switches 118, 120 and 124 are coupled to a summing amplifier 126 which combines the various signals in equal proportions. The summing amplifier is then coupled to an output amplifier 134 which is coupled to a transformer 136. The amplifier 134 and transformer 136 convert the output signal of summing 126 to a signal of amplitude and impedance required by the wire-line hookup or transmitter link used to couple the paging system encoder 14 to the paging system decoder 16.

The summing amplifier 126 also receives an input from the variable resistor 138 which is coupled to a programmable attenuater 140. The programmable attenuator 140 is coupled to two control signals from the peripheral interface adaptor 132 and a tone input from the low pass filter 142. The low pass filter 142 is coupled to a microcomputer 144. The microcomputer 144 generates the various control tone sequences of the paging system encoder and provides signals to the programmable attenuator 140 through PIA 132 to control the amplitude of the control tones coupled to the summing amplifier 126. The microcomputer 144 and the PIA 132 also control the operation of the mute switches in response to several input signals in accordance with the signalling scheme of the present invention. The present invention utilizes a widely used microcomputer integrated circuit designated MC6803 and available from Motorola, Inc. The companion peripheral interface adapter integrated circuit is designated MC6821 and is also available from Motorola, Inc.

The paging system encoder 14 is configured to provide direct user control via several switches, 146 through 162, which are disposed on a panel which is accessable to the user of the encoder. The switches 146, 148, 150, and 152 are connected to input ports of the PIA 132. Switch 146 when closed will cause the paging system encoder to enable the tone, modem and voice paths to be enabled simultaneously to the output terminal transformer for audio level set. Likewise switch 148 when closed will cause a series of audio test tones, generated by microcomputer 144 to be placed at the output terminals of the encoder. Switches 152 and 150 are included with the paging encoder circuit to allow the paging system to accommodate additional RF link transmitters to be used in a simulcast system. For example, if a paging transmitter site is located a large distance from the paging terminal site, a repeater site will be included in the system. Each repeater site will require a certain amount of time to allow the repeater transmitter to key and therefore the high level guard tone must appear for an extended time to allow retransmission to the paging transmitter site. Each link site requires approximately 250 ms to retransmit the high level guard tone. Switches 150, 152 are configured to provide a binary encoded input to the encoder circuit which activates an additional guard tone period to be generated by the paging encoder. The high level guard tone signal can be increased in 300 ms increments, and a maximum of 1200 ms can be effected by switches 150, 152. If both switches 150 and 152 are open, no high level guard tone will be added to the normal tone sequence. If switch 150 is open and switch 152 is closed, 300 ms of high level guard tone will be added to the initial tone sequence. Likewise, increments of 300 ms can be added to the high level guard tone sequences by providing the various combinations of switches 150 and 152.

The paging system encoder 14 is also configured to accept group and function tone select information through the keying mode select logic 30. The keying mode select logic accepts switch input from several sector select switches as well as a local key switch 154 and a three position mode switch 56. The keying mode and select circuit is shown in more detail in FIG. 3b. The keying and mode select switches are user programmable and are located within the paging system encoder. The various combinations of input switches are encoded in the keying and mode select logic which produces a plurality of station disable bits. The output of the keying and mode select logic circuit 30 is coupled to 3 PIA circuits 132B which coupled the keying and mode station disable bits into microprocessor 144. The microprocessor 144 then generates the appropriate sequence of function tone disable tones based on the station disable bits. This will be described in more detail later. Referring now to FIG. 3b, a detailed electrical schematic for a portion of the keying and mode select logic circuit 30. The actual keying and mode select logic circuit consist of an array of the circuit shown in FIG. 3b and is described in detail in Motorola instruction manual 68P81063E15-0 entitles "Simulcast System Controller and Paging System Encoder" dated 1982 and available from Motorola Communications Electronics, 1309 E. Algonquin Rd., Schaumburg, Ill.

The keying and mode select logic shown in FIG. 3b comprises a pair of inverters 38 and 40 coupled to a pair of NAND gates 42 and 44 respectively. These logic gate receive inputs through switches 32, 34 and 36 located on a front panel. NOR gates 42 and 44 are coupled to NOR gates 46 and 48 respectively. NOR gate 48 and 50 receive inputs from a switch 56 which cooperates with two resistors 62 and 64. Each transmitter is instructed key or dekey based on these inputs by using the signals described in FIG. 3b, each paging remote transmitter can be assigned to a particular secter as well as a particular group. Therefore the sector feature of the individual station control scheme does not depend on the particular group or function tone assignment of the remote simulcast station which are coupled to a power terminal 60. The outputs of NOR gates 48 and 50 are combined by NOR gate 52 which produces station disable bits. The truth table for the logic circuit shown in FIG. 3b, is given below:

| | | |
|---|---|---|
| 36 | 0 1 0 0 1 1 0 1 X | 0=Logical Low |
| 34 | 0 0 0 1 0 1 1 1 X | 1=Logical High |
| 52 | 0 0 0 0 0 0 0 0 X | X=Don't Care |
| 54 | 1 1 0 1 0 1 0 0 1 | |
| 58 | 0 0 1 0 1 0 1 1 1 | |
| SOBIT | 1 1 0 0 0 1 0 1 1 | (High-Disable) |

In addition to the function described above the keying and mode select logic interfaces with several sector inputs 84, 86, 88, and 90 which cooperate with switches 74, 76, 78 and 80. These inputs are combined by a NAND gate 82 and by diodes 66, 68, 70 and 72. These inputs indicate to the keying and mode select circuit that as many as four sectors of paging transmitters should transmit.

Referring again to FIG. 3a the paging system encoder circuit cooperates with the paging terminal 10 of FIG. 1, through the clear to page voice terminal 162, the clear to page binary terminal 160, the key analog terminal 156 and the key binary terminal 158. In operation, a paging subscriber will activate the paging terminal 10 of FIG. 1, through a telephone link by signalling the telephone number assigned to the unique pager address. The paging terminal 10 will then convert the telephone number to a signal comprising the exact pager address. The paging terminal 10 then signals the paging system encoder that a paging signal is imminent by activating either the key analog terminal 156 or the key binary terminal 158 depending on the type of pager being signalled. If the key binary terminal is activated, the paging encoder will generate the series of timed tones and pauses which instruct the remote transmitter to key or not and place the paging remote transmitter site in the binary transmission mode. When the transmitter has been properly set up and keyed, the paging system encoder will activate the clear to page binary terminal, and activate the binary modem tone mute switch 118 to pass modem tones to summing amplifier 126 and output transformer 136. Similarly, if the system is to be placed in the analog audio transmission mode, the paging terminal will activate the key analog terminal 156 and the paging system encoder will generate the series of timed tones and pauses which instruct the remote transmitter to key or not and which place the paging remote transmitter in the analog transmission mode.

Figure 4:
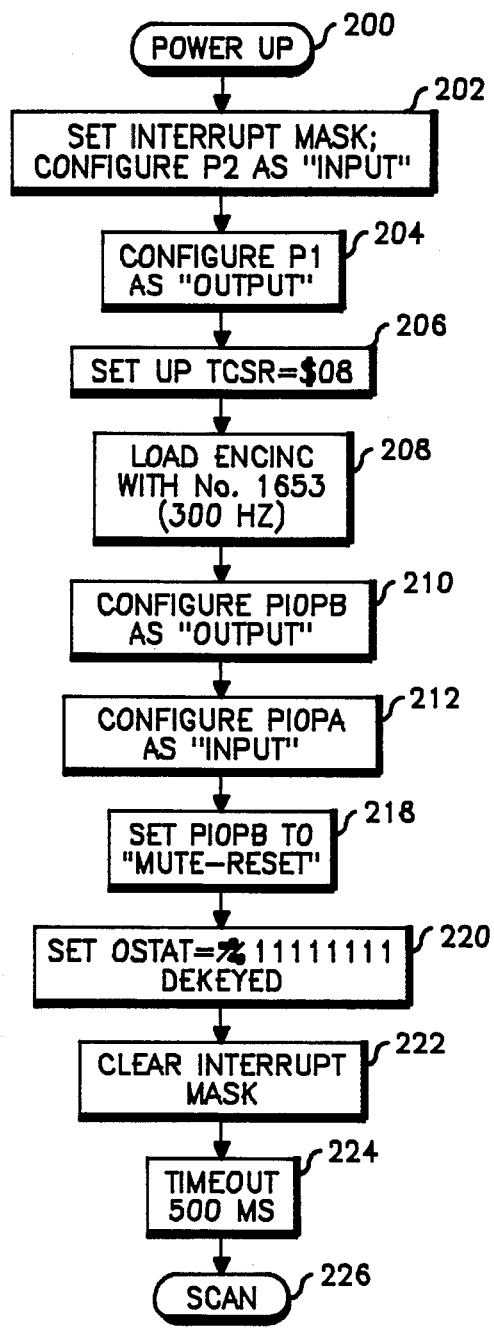

FIGS. 4 through 16 are flow diagrams which define the operation of the microcomputer 144 used in the encoder of FIG. 3. FIG. 4 details the operation of the initial program sequence when power is first applied to the paging encoder. Since it is not possible to predict a specific logic condition which will be present at any particular input or output terminal of the microprocessor or PIA, the power-up sequence of FIG. 4 establishes known conditions on all critical input and output terminals.

When power is first applied to the paging encoder 14, the program control of the microcomputer is configured to execute an initialization program 200. The program control then proceeds to item 202 and immediately sets the microcomputer interrupt mask which insures the program will not be interrupted during the power-up sequence. The program then initializes all random access memory variables.

The microcomputer 144 ports can be configured to function as either inputs or outputs to the microcomputer and must be configured according to program control. As noted in FIG. 3, the microcomputer 144 acts as the tone sequence generator for the paging system encoder. Any tones which may be present at microcomputer port P2 of FIG. 3 are shut off during the power-up sequence 200 by designating port P2 as an input. This step insures no tones are placed on the output of the encoder circuit until necessary.

The microcomputer 144 provides an internal tone generator which is controlled according to the state of an internal register. By entering a numerical value in the timer control and status register, a corresponding tone period will be generated by the tone circuit. According to the next item 206, the timer control and status register are initialized and subsequently, an arbitrary number is loaded into the TCS register.

The power-up sequence next designates the PIA ports as input or outputs.

Referring now to FIG. 3, signals KA, KB, HO1, HO2, TT and OA are coupled to PIA port A. Likewise, signals CTPA, CTPB, MO, M1, M2, M3, AT1, AT2 are coupled to PIA port B. In accordance with the present invention, FIG. 4 shows the PIA port configuration. Consequently item 210 configures PIA port A as an input and PIA port B configures as an output. The power-up sequence next initializes the values associated with PIA port B by placing the code on the PIA port B 218 which corresponds to opening or inhibiting all mute switches 118, 120, 124, 125 of FIG. 3, inhibiting the clear to page signals 160, 162 of FIG. 3 and by adjusting the programmable attenuator 140 of FIG. 3 for maximum attenuation.

The paging system encoder makes decisions as to what subsequent actions to effect based on two integral system status Bytes which are an indication of the system's past and present activity. The system status bytes are designated New Status (NSTAT) and Old Status (OSTAT). Since the system operation will be affected by the old system status, for instance an analog to binary transition, this byte must be initialized during the power-up sequence. Item 220 sets the system status byte OSTAT to a code comprising all binary ones, which indicate that the system is currently dekeyed.

The paging system encoder is now configured with initial conditions in critical areas which will ensure correct system operation. Subsequently, the interrupt mask is cleared 222, thus allowing the microprocessor to execute interrupt commands. Timeout period 224 is provided to allow all initial conditions on the system to stabilize. The paging encoder now enters the SCAN mode 300.

Figure 5A:
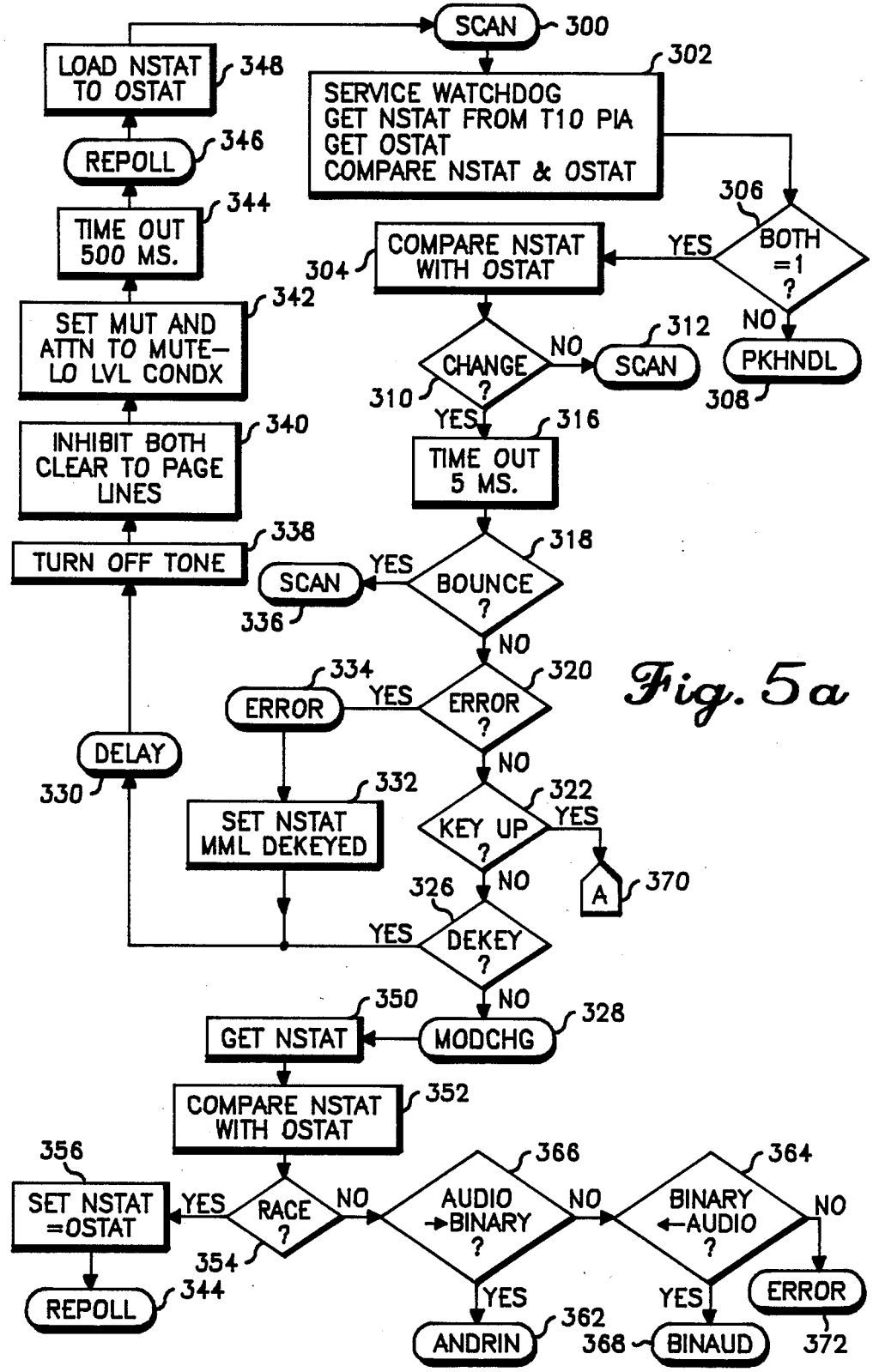

Referring now to FIG. 5, there is illustrated a flowchart embodying the scan method of the present invention. The flowchart in FIG. 5 provides a detailed description for the process steps necessary for implementing the scan method of the present invention in the paging system encoder 14 in FIG. 3. The scan routine forms the basic background operating scheme of the present invention. The primary task for the scan routine interprets key input commands from either hardware front panel switches or from the paging terminal and exits to one of five tasks depending on the condition of the key switches.

When the scan routine is activated, item 302 retrieves the system status bits D6 from the system status bytes NSTAT and OSTAT.

Referring now to decision 306, if both system status bytes NSTAT and OSTAT show a binary 1 in D6, which is an indication of the hardware panel key switch, then the system is dekeyed, and program will enter item 304. If either data bit D6 from NSTAT or OSTAT is a binary zero, the hardware panel key switch has been changed and the program will enter the panel key handler (PKHNDL) routine 308. Item 304 retrieves the system status bits D1 and D0 from the system status bytes NSTAT and OSTAT. Status bits D0 and D1 of NSTAT indicate whether the paging system encoder is being signalled, that is either an analog or binary paging signal is imminent from the paging terminal 10 or modem 12 of FIG. 1. Decision 310 then compares system status bits D1 and D0 which indicate if a key command has been received from the paging terminal. If NSTAT has not changed from the previous period OSTAT, the program returns to the initial item of the scan routine and continues searching for a change.

If NSTAT has changed the system will enter item 316, which provides a 5 ms time delay. This time delay provides enough time to detect a key bounce or an erroneous input. Decision 318 compares the key bit D0 or D1 with the state of the key bit D0 or D1 5 ms earlier. If a key bounce is detected, decision 318 returns program control to the first step of the scan routine.

If a key bounce was not detected, the program proceeds to decision 320 which examines the D0 and D1 status bits in the OSTAT status byte. If the D0 and D1 status bits show 00 which is an impossible condition at this point in the program, the program control will exit decision 320 and proceed to error routine 334. If an error is not detected the program proceeds to decision 322. If the system has been previously keyed in either the analog or binary mode, the program will proceed to decision 326. If the system was not previously keyed, the program will exit the scan routine and proceed to the select modulation (SELMOD) routine 370, which will be discussaed in more detail later.

As noted previously, if the paging system has been previously keyed the program will proceed to decision 326. At this point, the paging system will either dekey or change transmission modes.

If the system status bits· D1D0 of NSTAT and OSTAT indicate the sytem was previously keyed and is now required to dekey the program will proceed to the dekey routine 330. Alternatively, if the system status bits D1D0 of NSTAT and OSTAT indicate the system should remain keyed, but in another mode, the system will enter the modulation change routine 328.

The modulation change routine 328 occurs in mixed paging systems when binary pages are sent immediately after a tone-signalled page or visa versa. As previously discussed, mode information is carried on the system status bits D1D0. Item 352 retrieves the NSTAT status bits D1D0. Item 352 compares the NSTAT status bits with the OSTAT status bits. If the NSTAT status bits D1D0 are both equal to binary zeros, a race condition or overlapped key request is indicated. Decision 354 will then pass program control to item 356 which will then update the NSTAT status byte to the current valve of OSTAT and subsequently select the status update routine (REPOLL) 346.

If either NSTAT or OSTAT contains a binary one in D1D0, the program will proceed to decision 360. If the OSTAT status bits D1D0 show 10 and the NSTAT status bits show 01, an analog to binary transition is indicated, and decision 360 will select the AUDBIN routine 362, which will be discussed in more detail later. If AUDBIN is not selected, the program will proceed to decision 364. If the OSTAT status bits D1D0 show 01 and the NSTAT status bits show 10, decision 364 will select the binary to analog transition routine (BINAUD) 368. If BINAUD is not selected, an error has occurred and decision 364 will select the error routine 334.

If the error routine 334 is selected, item 332 will reset the NSTAT status byte value to the normal value (D1D0=11) indicating the system should be dekeyed. The Item 332 then selects the dekey routine 330.

When invoked, dekey routine 330 will execute the tasks required to dekey or turn off the paging transmitter stations and reset the paging encoder 14 for the next key-up sequence. The dekey routine begins with item 338 which designates microcomputer port P2 of FIG. 3 as an input, thus turning off any tone appearing on the port. The program proceeds to items 340 and 342 which updates the PIA port B bit status instruction so that the audio mute switches 118, 120, 124 and 125 of FIG. 3 are set to mute the signal paths, and so that the programmable attenuator is set for maximum attenuation. The program proceeds to item 344 which provides a waiting period required by the paging system to dekey. Item 344 then proceeds to the REPOLL routine 346. This routine is the end of the background loop. It updates the current status of the paging system encoder. Item 348 replaces the contents of the OSTAT register with the NSTAT status values, and then returns the program to the beginning of the SCAN routine 300.

Figure 5B:
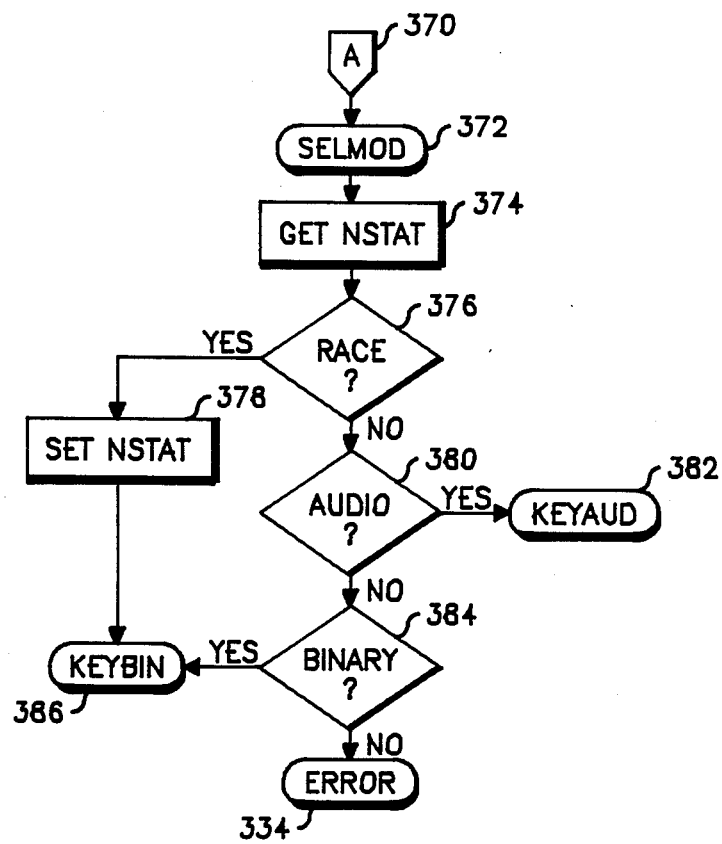

Referring now to decision 322, if the system status bits indicate a key-up condition, the program will proceed to the modulation selection routine, SELMOD, routine 370. FIG. 5b shows the program sequence for SELMOD. The SELMOD routine 370 selects one of two sequencing tasks to be performed by the paging system encoder, depending on the system status bits D1D0 which indicate the key analog and key binary signals of the paging terminal. Item 374 reads the NSTAT status bit for any keying activity. If both status bits D1D0 are binary zeros, a race condition is indicated, and decision 376 will select Item 378 giving binary priority if both analog and binary key requests are simultaneous. Item 378 will update the NSTAT variables D1D0 to a 01 condition and select the key bin routine 386.

If the NSTAT variables D1D0 show a non-zero condition, a decision 376 will select decision 380. If the system status bits D1D0 indicate an analog page, decision 380 will select the KEYAUD routine 382. If KEYAUD is not selected, the program will select decision 384. If the system status bits indicate a binary page, decision 384 will select the KEYBIN routine 386. If KEYBIN is not selected, decision 384 will select error routine 334.

Figure 6:
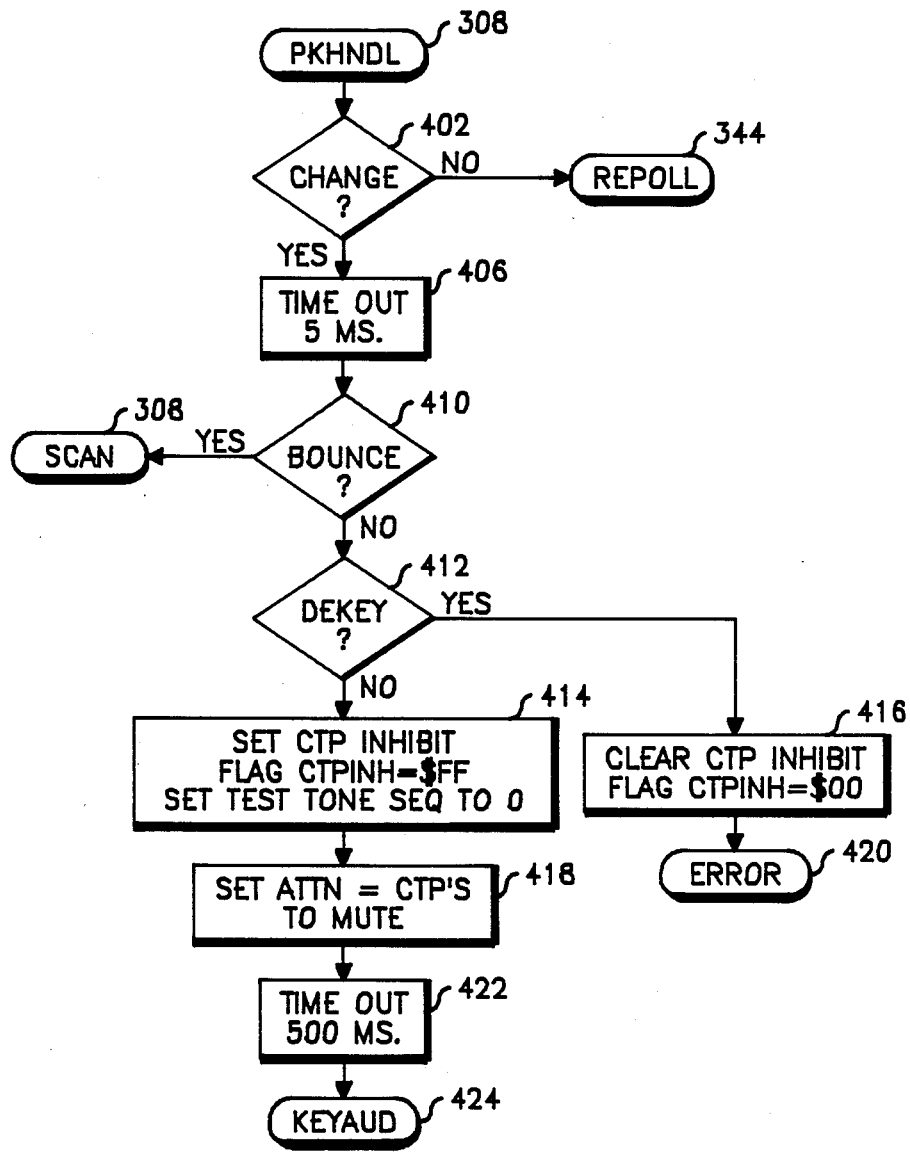

Referring now to FIG. 6, there is illustrated a flowchart embodying the panel key handler routine (PKHNDL) of the present invention. The PKHNDL routine 308 is used anytime the hardware panel key switch is activated. PKHNDL 308 begins with decision 402 which examines the NSTAT and OSTAT D6 status bits for any change. If no change is detected, decision 402 selects the Repoll routine 346. If a change is indicated, decision 402 will select item 406 which generates a 5 ms time pause in the program. Decision 410 examines the D6 data bit for a key bounce. If a key bounce is detected, program control will be returned to the SCAN routine 300. If a key bounce is not detected, the program proceeds to decision 412 which selects item 416, if a dekey command has been detected. Item 416 then clears the clear-to-page inhibit flag, and the program proceeds to the ERROR routine. No real error has occurred here, but the ERROR routine provides a proper status reset for a panel key operation.

If a dekey command is not detected, decision 412 will select item 414, sets the clear-to-page inhibit flag and sets the test tone sequence to step O. Item 418 then sets the programmable attenuator 140 and audio switches 118, 120, 124 to the mute condition. Item 422 then provides a 500 millisecond time delay before selecting the KEYAUD routine 382, since a hardware panel key can only activate the analog mode.

Figure 7:
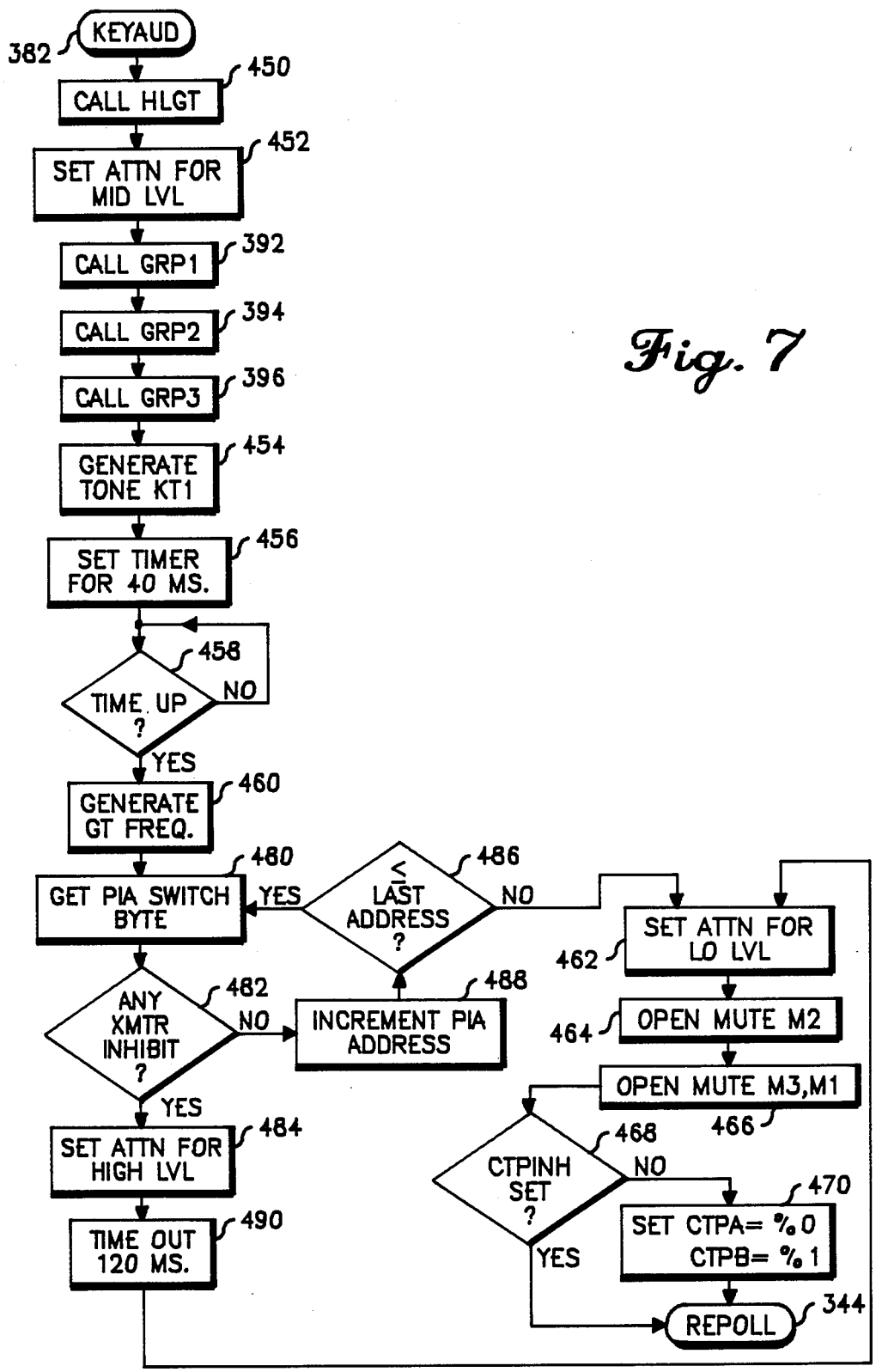

FIG. 7 shows a flowchart embodying the analog key-up routine (KEYAUD) 382 of the present invention. KEYAUD 382 is selected when the paging system encoder is to key up in the analog mode. KEYAUD sequences the tone attenuator, calls the tone sequencer and opens the tone and audio signal paths. It then signals the paging terminal when the paging system is clear to page.

When selected, KEYAUD proceeds to item 450 which selects the high level guard tone subroutine (HLGT) 450. HLGT causes the high-level guard tone sequence to be placed at the output of the paging encoder. This will be discussed in more detail later. When completed, HLGT returns program control to item 452 which adjusts the programmable attenuator 140 of FIG. 3 for mid-level attenuation. The program proceeds to item 392 which calls the group 1 routine described in FIG. 11a. Item 394 then selects the group 2 routine described in FIG. 11b. Item 396 then selects the group 3 routine described in FIG. 11b. Item 454 then sets the ENCINC or tone generator register to produce the function tone frequency. Item 456 and decision 458 cause the function tone to be produced by the microprocessor for 40 ms. When the function tone period has elapsed, the program will proceed to item 460 to generate a guard tone signal. Program control proceeds to item 480 which reads the PIA switch byte for function tone and transmit inhibit information. The station requires that the line PTT stay keyed in the analog mode. During long function tone strings the line. PTT signal becomes inactive since HLGT is not present for more than 1 second. Decision 482 and Items 484 and 490 produce an additional period of HLGT. If a transmit inhibit was not detected, program control will proceed to item 488 which increments the PIA address and selects decision 486. If the last address is not indicated item 480 will be selected otherwise, the program would then select item 462 which adjusts the programmable attenuator 140 of FIG. 3 to a low level corresponding to the level required by the low level guard tone. Subsequently, item 464 opens mute switch 120 corresponding to the audio paging tones, and item 466 opens the remaining two mute switches. Decision 468 examines the clear to page inhibit flag. If the clear to page inhibit flag is set, because of a hardware panel key, the decision 468 will select the REPOLL routine 344. If the clear to page inhibit flag is not set, decision 468 will select item 470 which enables the clear to page analog line and inhibits the clear to page binary line.

Figure 8:
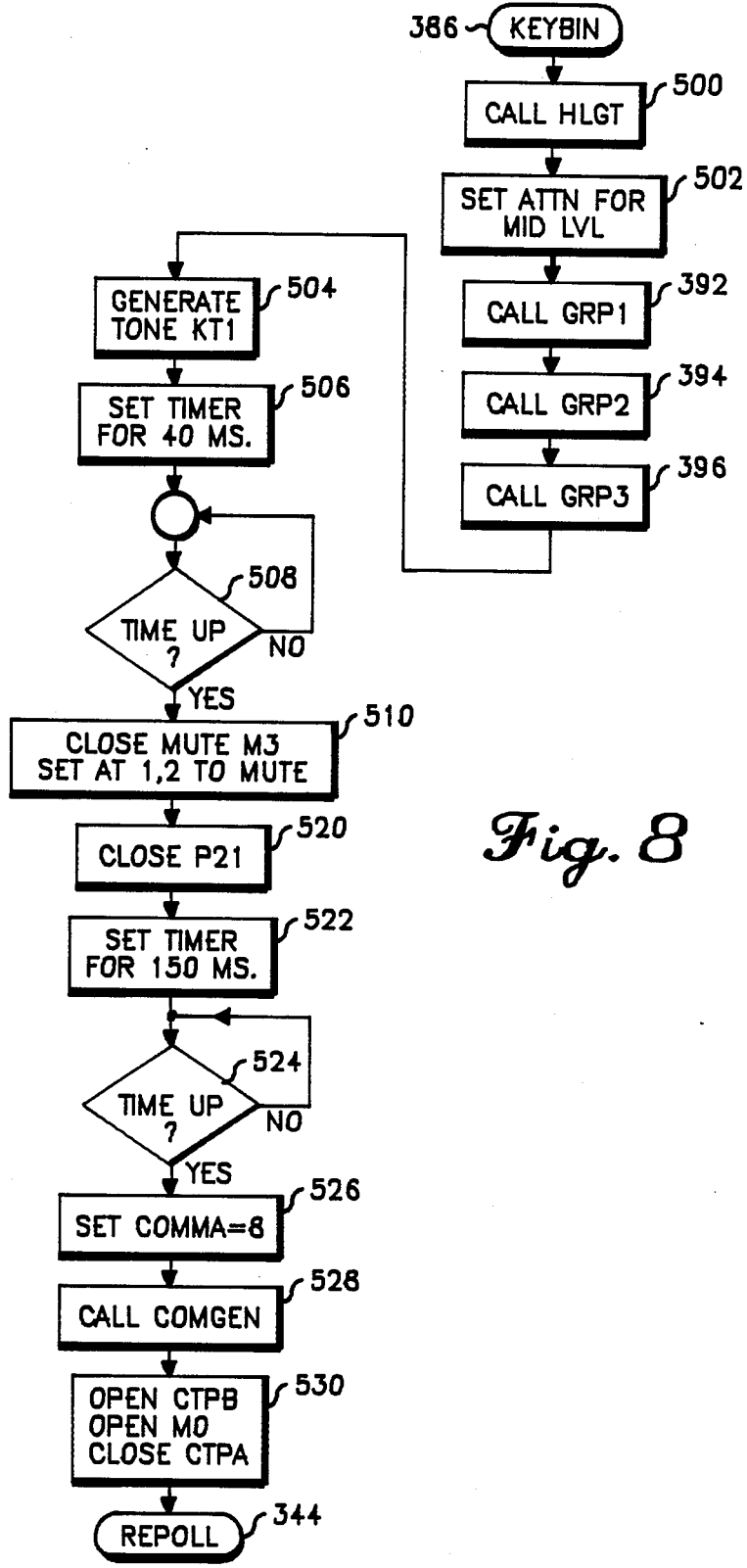

Referring now to FIG. 8, there is illustrated a flow-chart embodying the binary key routine (KEYBIN) of the present invention. When activated, KEYBIN proceeds to item 500 which calls the HLGT routine 450. When executed, HLGT will return program control to item 502 which adjusts the programmable attenuator 140 of FIG. 3 for mid-level attenuation. The program proceeds to item 392 which calls the group 1 routine described in FIG. 11a. Item 394 then selects the group 2 routine described in FIG. 11b. Item 396 then selects the group 3 routine described in FIG. 11b. The program then proceeds to item 504 which adjusts the ENCINC register to produce the function tone frequency. Decision 508 causes this tone to be placed at the output of the paging encoder for 40 ms. The program then executes item 510 which sets the programmable attenuator 140 of FIG. 3 and mutes attenuator mute switch 125.

Item, 520 then designates microcomputer port P2 as an input, thus inhibiting any tone output from the microprocessor. Item 522 and decision 524 then cause the microprocessor to pause for a time period so that a 150 ms. pause will appear at the output of the paging encoder. When 150 ms. has elapsed, item 526 sets the "comma" counter for the desired number of comma cycles, and Item 528 calls the comma routine 528. This will be discussed in more detail later. The program then proceeds to item 530 which enables the clear to page binary line, inhibits the clear to page analog line and opens the binary modem tone signal path. The program then selects the REPOLL routine 346.

Figure 9:
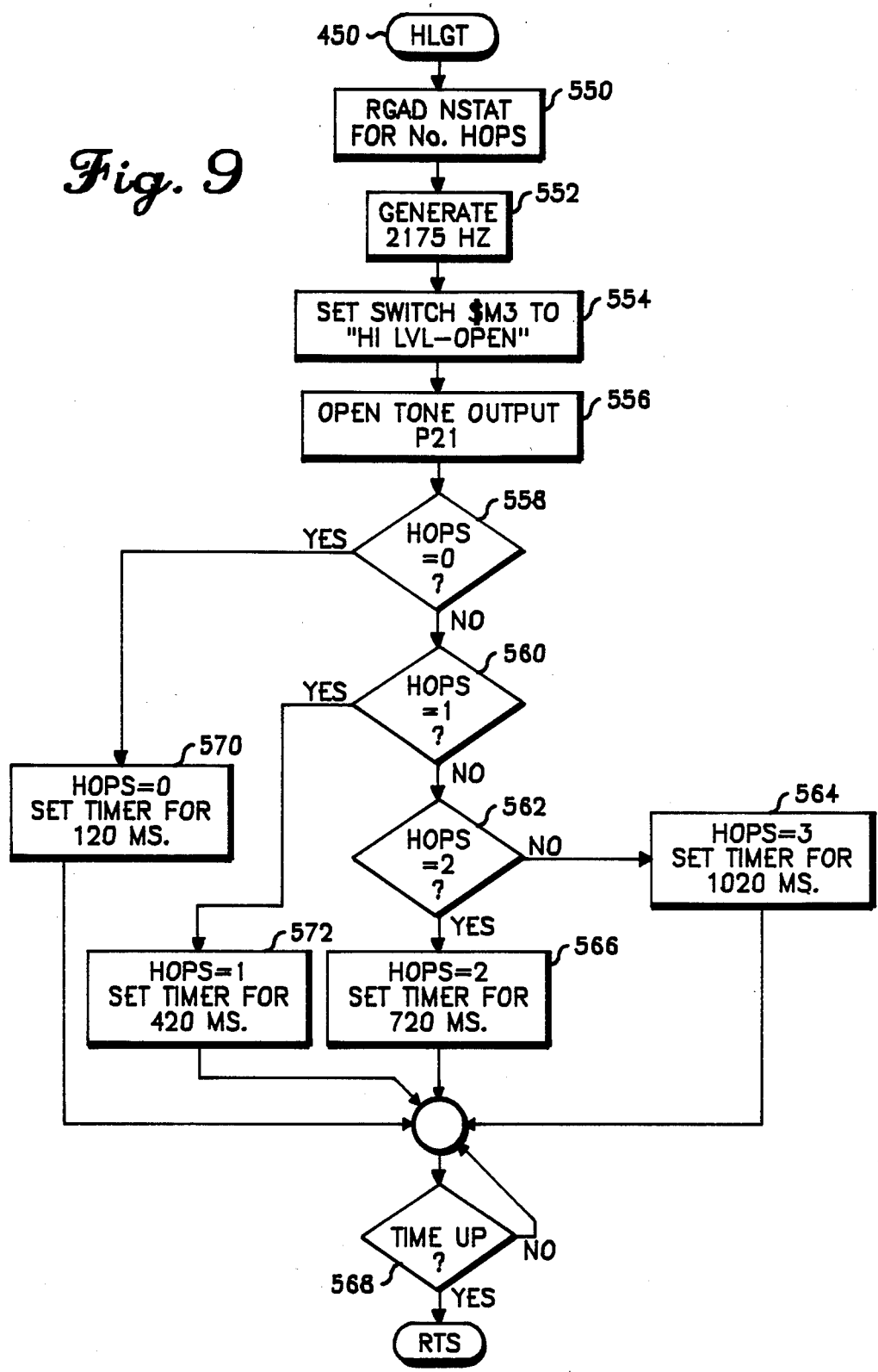

Referring now to FIG. 9, there is illustrated a flow-chart embodying the high-level guard tone (HLGT) routine of the present invention. The high-level guard tone signal signals a paging transmitter site that a paging signal is imminent and the transmitter should turn on. In a system which uses link stations to connect the remote stations, additional periods of high-level guard tone are required to allow each station along the link to receive the high-level guard tone frequency.

The HLGT routine begins with item 550, which reads the NSTAT Hop select data bits D2D3 which reflect the user selectable internal hardware condition of switches which provide information as to how many link transmitters are in use and subsequently, what time period of high-level guard tone is required. The program then proceeds to item 552 which adjusts the ENCINC register to generate a guard tone frequency. Item 554 then adjusts the programmable attenuator 140 of FIG. 3 for high level or minimum attenuation and then opens the microcomputer tone mute switch 125. Item 556 then designates microprocessor port P21 of FIG. 3 as an output, thus enabling the tone output of the microprocessor. The program then proceeds to decisions 558, 560, 562 which examine the NSTAT status bits D2D3 to determine the number of HLGT periods required. If no additional guard tone is required, decision 558 will select item 570 which will cause HLGT to be generated for 120 ms. Similarly, if one transmitter hop is required, decision 560 will select item 572, which will cause HLGT to be generated for 420 ms. If two hop periods are required, decision 562 will select item 566 which will cause HLGT to be generated for 720 ms. Otherwise, item 564 will be selected, and HLGT will be generated for 1020 ms. Decision 568 examines items 570, 572, 566 or 564 and evaluates the elapsed time depending on which item was selected. When the HLGT sequence has elapsed, decision 568 will return the program control to the subroutine which selected the HLGT routine.

Figure 10:
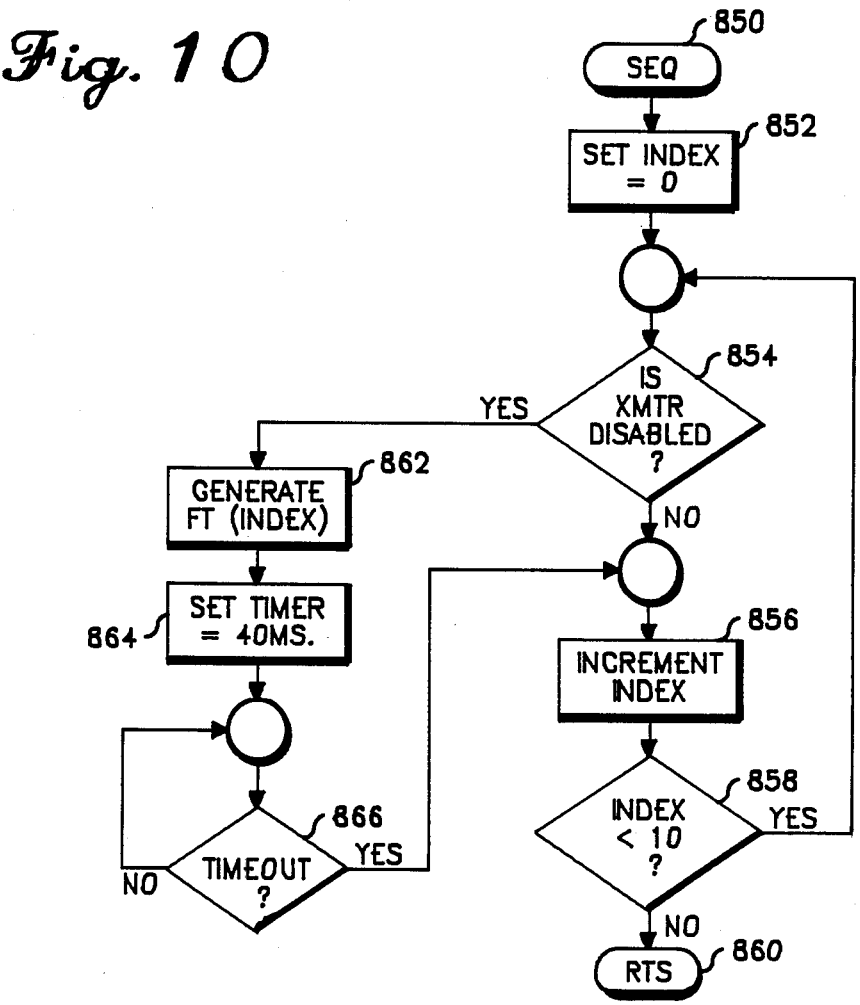

Referring now to FIG. 10, a detailed flow diagram for the function tone generator and sequencer (SEQ) utility module is shown. SEQ 850 begins with item 852 which establishes a pointer index value of zero. The program proceeds to decision 854 which progressively checks each PIA bit, that has been set by the circuitry shown in FIG. 3b, to determine if the corresponding transmitter should be disabled. If the transmitter is disabled, program control proceeds to item 862. Item 862 and subsequent items form the function tone generator. Item 862 begins to generate a function tone and program control passes to item 864. Item 864 examines an internal microprocessor timer and in cooperation with decision 866 causes the function tone to be generated for approximately 40 milliseconds. Program control then proceeds to item 856. Returning now to decision 854, if the tramsmitter was not disabled, program control proceeds directly to item 856 which increments the index. Decision 858 then examines the index. If less then ten PIA bits have been checked, program control returns to decision 854 to determine if subsequent transmitters should be disabled. If all ten bits for the particular group have been checked, program control returns to the subroutine which activated the SEQ routine.

Referring now to FIG. 11A, the group 1 subroutine described in FIG. 5 is shown. Group 1 392 begins with item 890 which reads the PIA 132B inputs as shown in FIG. 3. Item 890 searches this PIA information for transmitter disabled status. Item 892 is then selected which follows the sequence subroutine as described in FIG. 10. Program control then returns to the subroutine which activated group 1 either KEYAUD 382 as shown in FIG. 7 or KEYBIN 386 as shown in FIG. 8.

FIG. 11B shows group 2 subroutine 396 described in FIG. 7. Group 2 begins with item 898 which reads the second section of PIA 132B as shown in FIG. 3 for transmitter disable status. The program then proceeds to decision 898. If all transmitters are to be keyed, program control returns to the subroutine which activated the group 2 routine. If certain transmitters are to be disabled, program control proceeds to item 900 which generates keying sequence tone two. Item 902 and decision 904 cause the keying sequence tone to be generated for 40 milliseconds. When the 40 milliseconds time has elapsed, item 906 selects the sequence routine of FIG. 10. Program control then returns to the subroutine which activated the group 2 routine.

Referring now to FIG. 11C, there is shown a detailed flow diagram for the group 3 routine 394 as described in FIG. 7. Group 3, 394 begins with item 910. This module determines which transmitters in group 3 of the simulcast sytem are to be keyed by reading the select inputs from a section of PIA 132B as shown in FIG. 3. It then generates a keying sequence tone and then calls the function tone sequence routine (SEQ) to generate the required tone sequence. Also, if no function tones were sent in group 2, keying sequence tone 2 is also sent. Item 910 reads PIA transmitter select inputs for group 2 information. If the group 2 information indicates that no transmitters in group 2 transmitted during the last cycle, decision 912 selects item 914 which generates keying sequence tone 2. If the group 2 information indicated that a transmitter has been keyed in group 2, program control proceeds directly to item 916 which reads PIA 132B for group 3 information. Program control proceeds to decision 918. If all transmitters are to be keyed in group 3, program control proceeds directly to the subroutine which selected the group 3 routine. If every transmitter is not to transmit within the group 3 group, program control proceeds to item 920 which generates keying sequence tone 2. Item 922 in decision 924 cause the keying sequence tone to be generated for approximately 40 milliseconds. Item 926 then selects the sequence subroutine described in FIG. 10. Program control then passes to the subroutine which accessed the group 3 routine.

Figure 12:
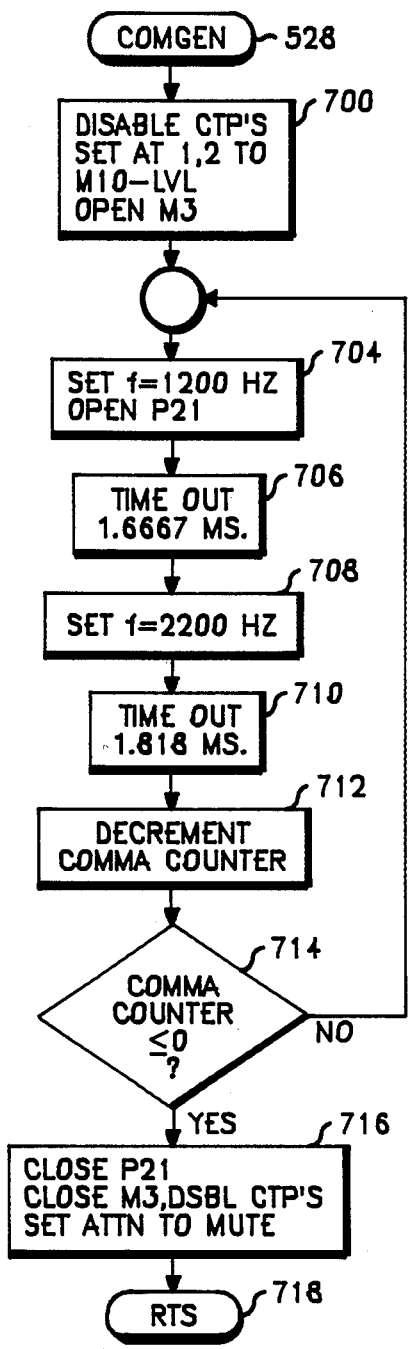

Referring now to FIG. 12, there is illustrated a flowchart embodying the binary comma generator routine (COMGEN) of the present invention. COMGEN generates a burst of (N) mark-space modem tone sequences of standard tone frequencies at 1200 Hz or 2200 Hz for asynchronous modems.

COMGEN begins with item 700 which disables all clear-to-page signals, opens the modem tone mute switch 118 of FIG. 3 and adjusts the programmable attenuator 140 of FIG. 3 for mid-level attenuation. The program then proceeds to item 704 which instructs the microprocessor to generate a 1200 Hz signal by loading the ENCINC register and designating microcomputer port P2 as an output. Item 706 then generates a time period which causes the 1200 Hz signal to be generated or 1.6667 ms. This signal comprises a FSK binary one. The program then proceeds to item 708 which instructs the microprocessor to generate a 2200 Hz signal by addressing the ENCINC register item 710 and then causes the 2200 Hz signal to be generated for 1.818 ms. This signal comprises a FSK binary zero. When this time has elapsed, item 712 will decrement the comma counter which was initialized by the routine utilizing the COMGEN routine. Decision 714 examines the comma counter register. If the comma counter is currently a non-zero value, decision 714 will return program control to item 704. If the comma counter contains a zero value, the program will proceed to item 716 which designates microcomputer port P2 as an input, thus inhibiting the microprocessor tone generator. Item 716 also closes the attenuator mute switch, disables all clear-to-page signals and sets the programmable attenuator or maimum attenuation. Item 718 then returns program control to the routine which activated COMGEN.

Referring now to FIG. 13, there is illustrated a group of flowcharts embodying the time delay generator routines of the present invention. These routines are utilized whenever the microprocessor is required to generate tones or pauses for a specific period of time, as well as any other task which requires a timekeeping function.

FIG. 13a shows a flowchart illustrating the timer set routine TSET which is called by background routines anytime an elapsed time timer is to be set up. The microprocessor 144 of FIG. 3 utilizes a 16-bit free-running counter register (FRR) to generate time information. In addition, a second 8-bit register (TIME) is utilized. Whenever the free-running register contains all binary one's, an overflow will activate the TOFIN interrupt routine which will increment the value stored in TIME. Therefore, subsequent overflows will be accumulated in TIME via the TOFIN interrupt routine.

The TSET routine 750 begins with item 752 which saves the values stored in FRR and the index register. The program proceeds to item 754, and captures the present time as indicated by the value of FRR. Item 756 then retrieves the required time delay value and adds this value to the value stored in FRR. This target value will be an indication of the value of FRR when the desired time has elapsed. Item 758 then restores the registers and stores the computed time in a target register, (TARGET), and program control returns to the routine which activated TSET.

FIG. 13c illustrates a flowchart showing the timer interrupt overflow routine (TOFIN) of the present invention. This routine is entered every time the value stored in FRR increments to a value represented by a binary one in every bit of the register.

TOFIN begins with item 770 which clears the timer overflow interrupt flag allowing the timer to generate an interrupt during the subsequent timeout. Item 772 then increments the value stored in TIME. Item 774 then services the watchdog timer. The watchdog timer is a hardware device which prevents runaway conditions in the microcomputer 144. If the watchdog timer is not addressed within a predetermined period, the timer will reset the microprocessor. The watchdog timer prevents runaway conditions in the microcomputer. Item 774 will then return program control to the routine being executed when the interrupt occurs.

FIG. 13b shows the timer compare interrupt handler routine (TONOUT) which generates a square-wave signal, and is used for tone encoding. TONOUT generates a tone frequency based on the value stored in the ENCINC register. TONOUT can generate frequencies which range from 300 to 3000 Hz.

TONOUT is activated anytime the value of an internal register (TCOMPR), related to the value of ENCINC, is equal to the value of the free-running register. When the TCOMPR value is equal to the value of the free-running register, an interrupt will activate TONOUT 760. Item 762 will then toggle the microprocessor port P21. Item 764 then updates the TCOMPR register to generate an interrupt a half period later. Item 764 subsequently returns the program control to wherever the program was when it was interrupted.

Figure 14:
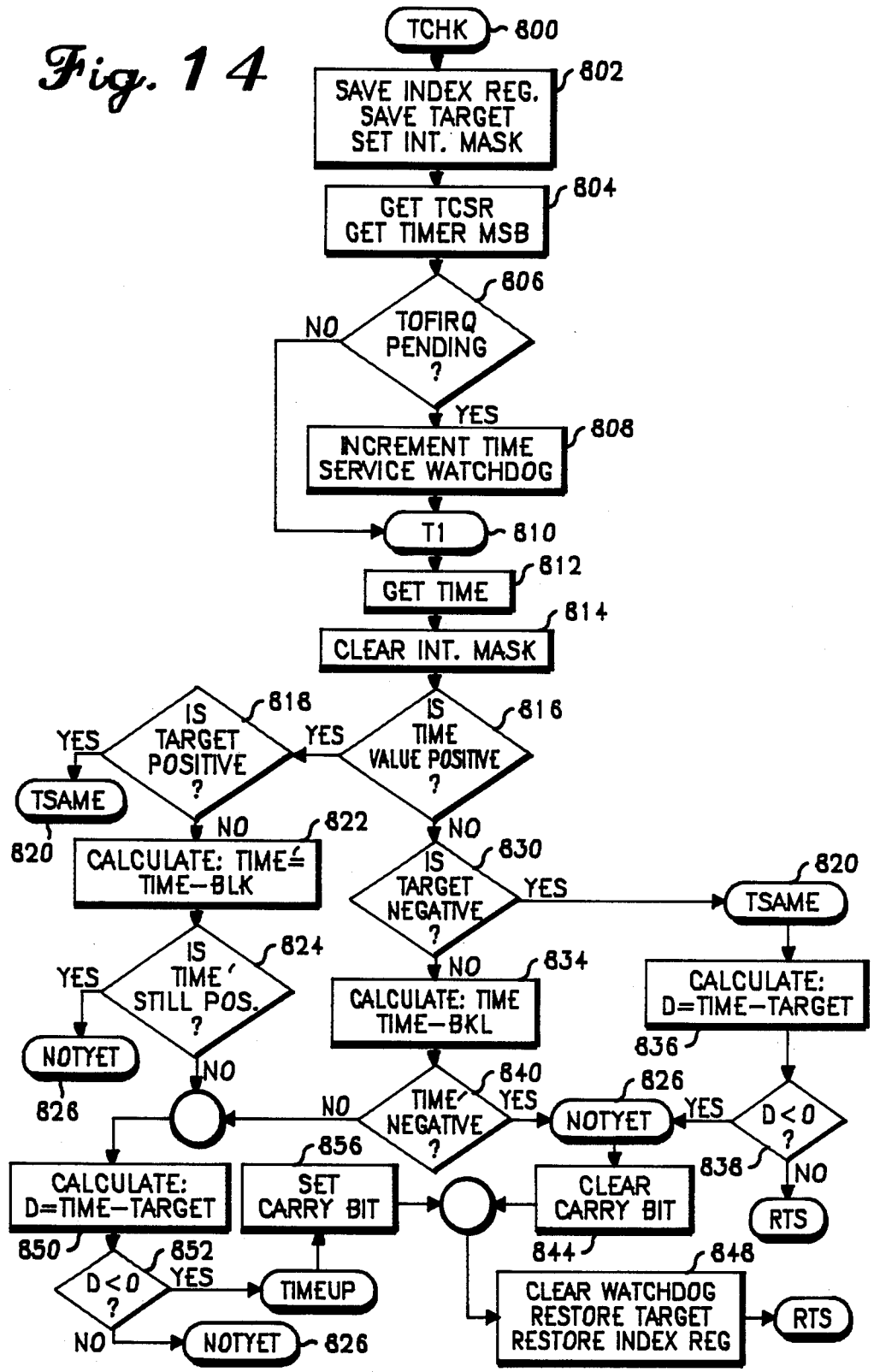

Referring now to FIG. 14, there is illustrated a flowchart embodying the timer check routine TCHK of the present invention. The TCHK routine decides whether the timer interval, previously established by the TSET routine, has elapsed. It is called by the background routines which utilize the target parameter of FIG. 13. TCHK captures the present time from TIME and the MS byte of FRR in Items 804 and 812. Item 802 saves the TARGET time value.

Items 816 through 856 test present time compared to TARGET time. If present time equals or exceeds TARGET, TCHK returns control to the calling routine with carry bit set. Otherwise control is returned with Carry Clear.

The mathematics of checking for "greater than" or "less than" is complicated by the fact that the incremented TIME value will eventually set the most significant bit. Once set, TIME is considered a negative number for math functions and would test as "less than" the TIME value just before the MSB was set. Much of the logic discussed below deals with reconciling this anomaly.

TCHK 800 begins with item 802 which saves the values contained in the index and target registers and sets the interrupt mask 804. Item 804 retrieves the value stored in the TCSR register and also retrieves the value of the TIME register most significant bit. If these values indicate that an interrupt which would activate TOFIN is pending, decision 806 will select item 808 which increments the value stored in TIME and resets the watchdog timer. The program will then proceed to item 812. If an interrupt is not pending, decision 806 will select item 812 directly. Item 812 retrieves the value stored in TIME, and item 814 clears the interrupt mask.

Decision 816 compares the values of the previously stored TARGET and TIME registers. If the values stored in TIME have the same sign the program will proceed through decision 818. If the target value is also positive decision 818 will direct program control to TSAME by selecting item 836, which calculates the differnce between the TIME and TARGET registers. If TIME minus TARGET is greater than zero, decision 838 will return program control to the subroutine which selected TCHK. If the value of TARGET minus TIME is less than zero, the program proceeds to the NOTYET routine 842 by selecting item 844. Item 844 clears the carry bit of the free running register FRR. The program then proceeds to item 848 which resets the watchdog timer and restores the TARGET and index registers and returns program control to the subroutine which selected TARGET.

Referring back to decision 818, if the value stored in time is positive, and the value stored in target is negative, decision 818 selects item 822 which calculates a new value for TIME based on an estimate of the maximum amount of time which could have elapsed since the routine was activated. This new value is known as the latency period. If the new value of TIME is still positive, the routine will select NOTYET 826. If this new value of time is now negative, the program will proceed to COMMON 828. Referring now to decision 816, if TIME is negative, the program selects decision 830. If the value stored in TARGET is negative, the program proceeds to TSAME 832. If the value stored in TARGET is positive, decision 830 will select item 834, which calculates a latency period in eactly the same manner as item 822. Item 834 then proceeds to decision 840 which evaluates the new value of time.

If the new value of TIME shows a negative value, the program will proceed to NOTYET 842. If the new value of TIME is positive, decision 840 will select COMMON 828.

COMMON 828 begins with item 850 which calculates a value equivalent to TIME-TARGET. The program then proceeds to decision 852. If the new calculated value is negative, decision 852 selects item 856 which sets the carry bit and then selects the RET routine 846. If the new calculated value is positive, decision 852 selects the NOTYET routine 826.

Figure 15:
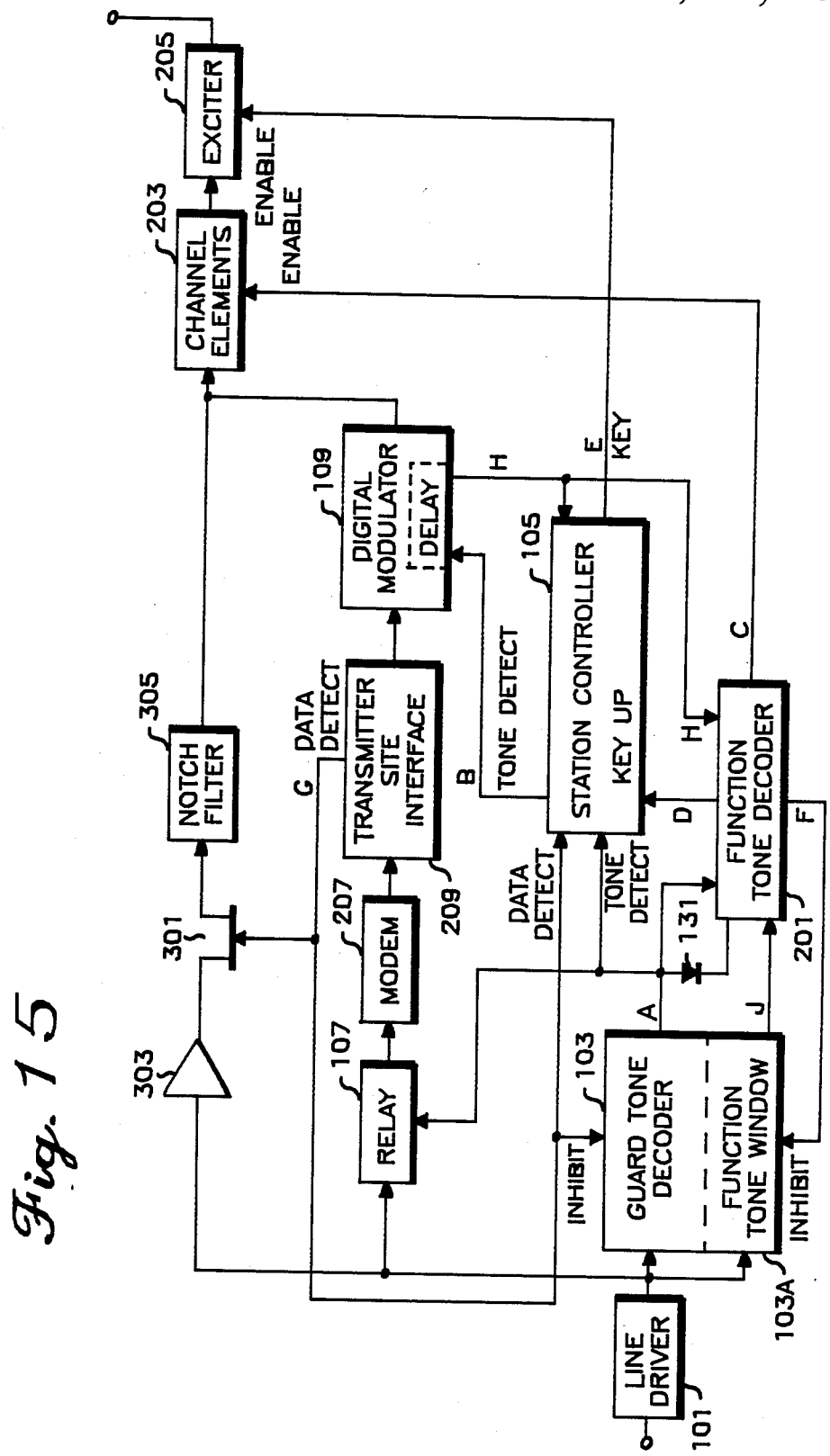
FIG. 15 is an electrical schematic of the decoder which decodes the required signalling scheme of the present invention.

FIG. 15 shows a block and circuit diagram for the paging remote station system decoder that is responsive to the signalling scheme described in FIG. 2. A more detailed electrical schematic for the remote station decoder is illustrated in Motorola document 68P8106E70, published May, (1982) entitled "PURC Paging Stations" available from the Service Publication Department of Motorola, Inc., 1301 East Algonquin Rd., Schaumburg, Ill., or from Motorola C & E Parts, 1313 East Algonquin Rd., Schaumburg, Ill. The decoder receives the page information from a local or remote terminal at line drive 101. The station is first keyed up when the decoder receives the guard tone-function toner signal from the terminal. The line driver 101 receives the guard tone-function tone and directs it to guard tone decoder 103. The guard tone decoder 103 detects the guard tone frequency and sends a signal A to relay 107 and the station controller 105 which in turn outputs a signal B to a digital modulator 109. Upon detection of a high level guard tone by the guard tone decoder 103, the guard tone decoder enables function tone window 103a which allows the function tone to pass to the function tone decoder 201. Upon detection of the function tone, the function tone decoder 201 generates an output signal C which is delivered to channel element 203 which activates the channel element in preparation for transmission of a signal. A second output from the function tone decoder provides a signal D to the station controller 105. Signal D tells the station controller to key the exciter in the transmitter and thereby fully enable the base station transmitter. Therefore, upon receipt of signal D, the station controller 105 sends a signal E to turn on exciter 205.

Signal A from the guard tone decoder 103 causes relay 107 to open and thus place modem 207 offline. Signal A will be removed from relay 107 and signal B is removed from digital modulator 109 at approximately 130–150 milliseconds after loss of guard tone. Since all analog data is summed with a control tone that corresponds to the guard tone frequency, signal A from guard tone decoder 103 will continue to be applied to the station controller 105 as long as analog data and its guard tone carrier are detected. Therefore, signal A will continue to hold open relay 107 for the duration of guard tone plus an additional time period of approximately 130–150 milliseconds. The function tone decoder 201 immediately thereafter disables the function tone window 103a with signal F.

After the guard tone decoder 103 ceases to detect a guard tone, signal A will be removed from the delay enable of station controller 105 within approximately 70 ms. Any further signals received by the line driver from the remote or local terminal will now be seen by the modem 207. The modem 207 will convert the audio FSK received from the terminal to a shifting DC voltage which serves as an input to the transmitter site interface 209.

When the remote transmitter site interface 209 detects active data (active since the modem will consider guard tone as a static data) it will generate a data detect signal G which opens or disables the transmit audio path by way of FET 301. The transmit audio path is defined by amplifier 303, notch filter 305. The notch filter 305 serves to notch out the guard tone frequency. The data detect signal G will remain as long as the transmitter site interface continues to receive binary data from modem 207. Signal G also disables or inhibits the guard tone decoder 103 in order to prevent the falsing of signal A and in addition causes signal B to be applied to digital modulator 109. The transmitter site interface 209 passes the binary data to the digital modulator 109 which modulates the binary data to produce a frequency shift keying-non-return to zero output (FSK- NRZ). The FSK output is applied to the input of element 203 to be transmitted by the base station.

If a voice message is to follow the binary information, another time period pause of approximately 50 milliseconds is introduced into the signalling scheme as described in connection with FIG. 2. This 50 millisecond time pause allows the transmitter site interface 209 sufficient time to remove the signal G from the FET 31 and station controller 105 and guard tone decoder 103. Therefore, after binary data is no longer detected by the transmitter site interface 209, the data detect signal G is removed over approximate 50 millisecond time period. Immediately thereafter, a high level guard tone is again sent to the decoder and detected by the guard tone decoder 103. This causes signal A to be applied to the relay 107 and station controller 15 which in turn causes signal B to be applied to digital modulator 109.

Immediately after the high level guard tone is received, the analog signal on the guard tone carrier is received. The guard tone carrier keeps signal A from guard tone decoder 103 present at the delay input of station controller 105. The presence of low level guard tone keeps signal A applied to relay 107 for the duration of the voice plus the 130-150 millisecond time delay. The voice message is transmitted through the audio path and stripped of the guard tone carrier at notch filter 305. At the completion of the voice message, the guard tone decoder 103 no longer receives and detects a guard tone and therefore signal A to the station controller 105 and relay 107 is removed.

After the loss of signal A relay 107 is closed and the modem 207 is on line to receive any binary data from line driver 101. Removing signal B from digital modulator 109, the digital modulator begins a count of between 275-325 milliseconds at the end of which signal H (which appears immediately upon the appearance of signal B) is removed from the station controller 105 which causes signal E to be taken away from exciter 205. Thus, the station is dekeyed since it has not received any additional binary or analog information for a delay in signal H for 300 ms.

As long as any of the signals D and H appear at the station controller 105, the output signal E will keep the exciter 205 enabled and thus the base station transmitter keyed up. By the appropriate delay in deactivating signal B, the station controller 105 provides the decoder ability of interactively handling binary pages and analog pages with analog voice.

Figure 16:
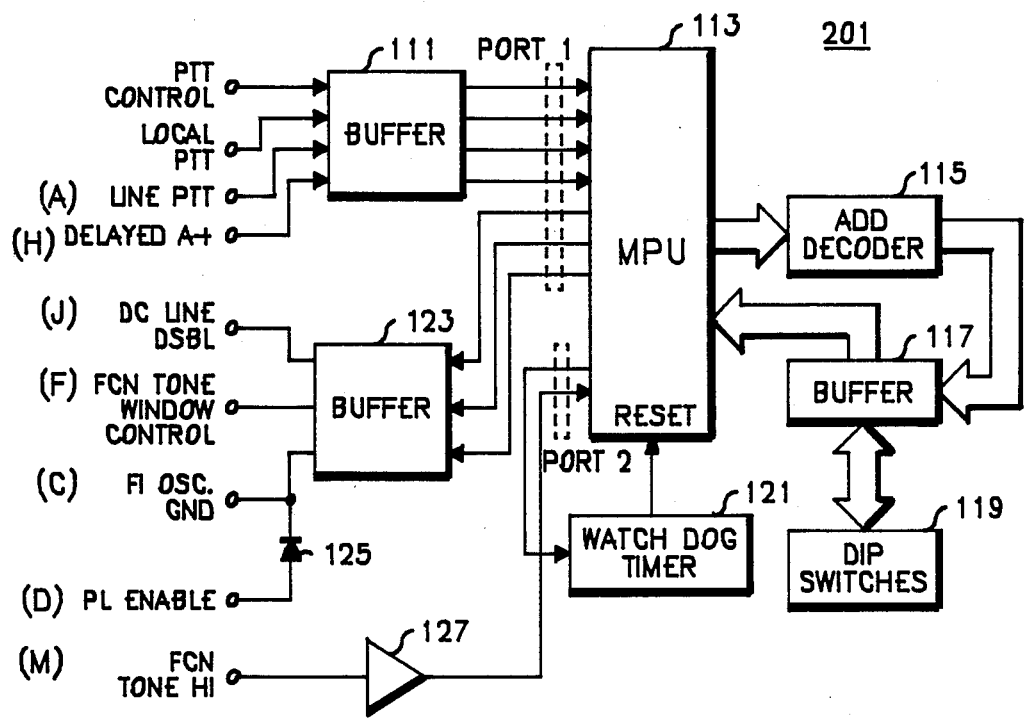
FIG. 16 is a detailed electrical schematic of the function tone decoder of the individual station controller of FIG. 3.

FIG. 16 shows a detailed electrical schematic of the function tone detector module 201 of FIG. 15. The function tone detector consists of a buffer register 111 which interfaces between a microprocessor 113 and the various transmitter keying control inputs. A second buffer register 123 connects between the microprocessor 113 and the paging transmitter control unit of FIG. 15. As noted in FIG. 15, the function tone detector controls the simulcast transmitter output through the buffer 123 outputs. The microprocessor 113 also interfaces with a bank of user programmable switches which are used to select group and function tone identity for a particular simulcast remote site. The microprocessor 113 cooperates with an address decoder 115 and the user programmable dip switches through the buffer 117. The microprocessor 113 also cooperates with a watch dog timer 121 which monitors the microprocessor for abnormal program conditions.

The detailed operation of the microprocessor 113 is defined by the flow diagrams shown in FIGS. 5 through 16. In general however the function tone detector 201 receives incoming function tone signals through buffer 127. These function tone signals are analyzed to determine if a valid function tone sequence has been received. If no valid function tones have been received the microprocessor will examine the various PT control signals and if instructed to do so, will key the transmitter with the appropriate control signals.

If a valid function tone sequence has been received, the function tone detector will prevent the simulcast remote station from transmitting.

Figure 17:
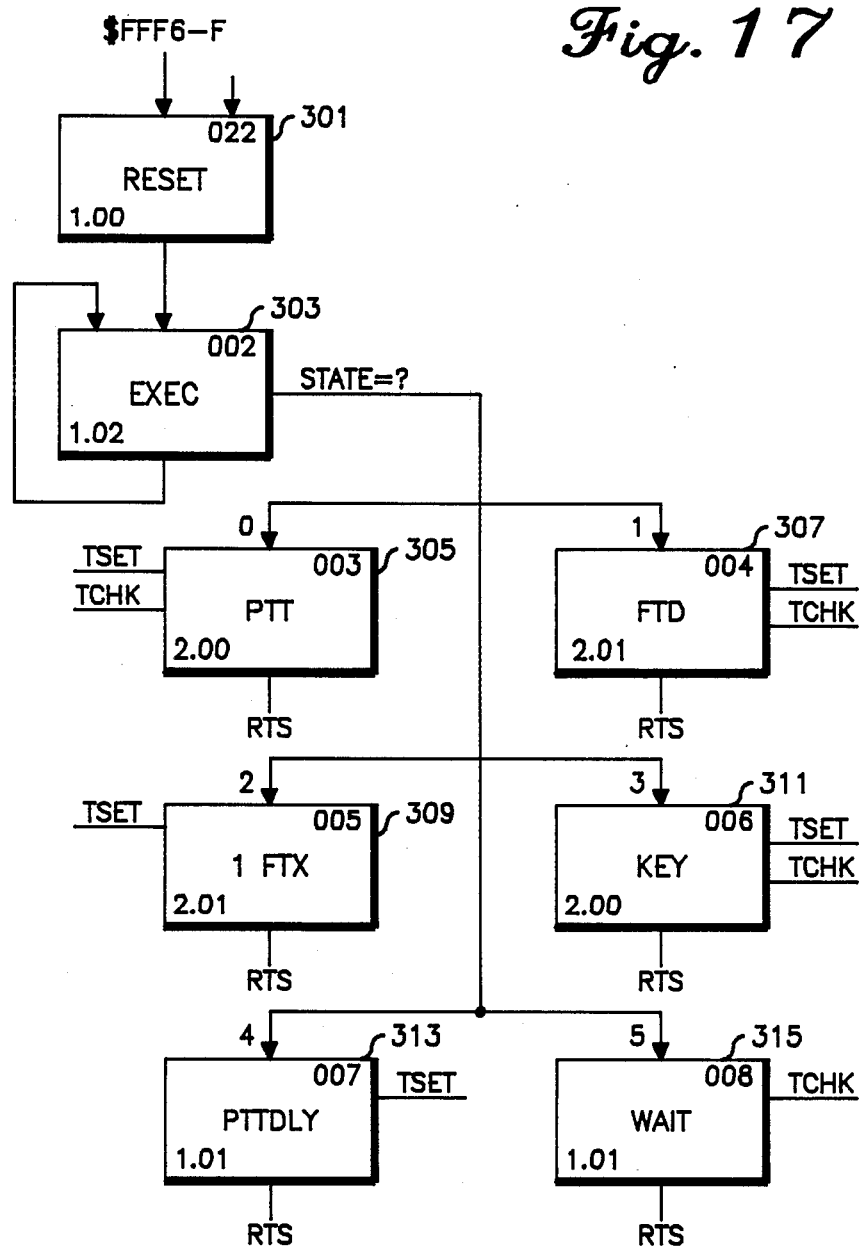

Referring now to FIG. 17, there is shown a structure diagram defining the hierarchical relationships between the various program routines used in the function tone detector shown in FIG. 16. Upon initial activation, the decoder of FIG. 15 will first activate the reset module which initializes the simulcast control module at power-up time. It sets the signalling state to search for a line push-to-talk (A) and passes control to the background loop EXEC module 303. The EXEC module 303 is the underlying simulcast control module and background routing module. This module schedules and calls the background task subroutines that make up the background subroutines that make up the background loop. It also calls the signalling state handler modules which are determined by the value of several of the bits in the state variable byte. If a new state is being entered, the set-up routine for the particular state is called first. After this, other utility background routines are called, and then the whole process repeats indefinitely. Program control passes from the exec module to any of the other six handler modules. Program control can pass from the EXEC module 303 to PTT module 305, to the function tone decode handle module 307, to the function tone executor module 309, to the key-up handler 311, to the line push-to-talk lock-up delay handler 313, or to the simulcast control wait de-key handler module 315. These modules will be discussed in more detail later.

Figure 18:
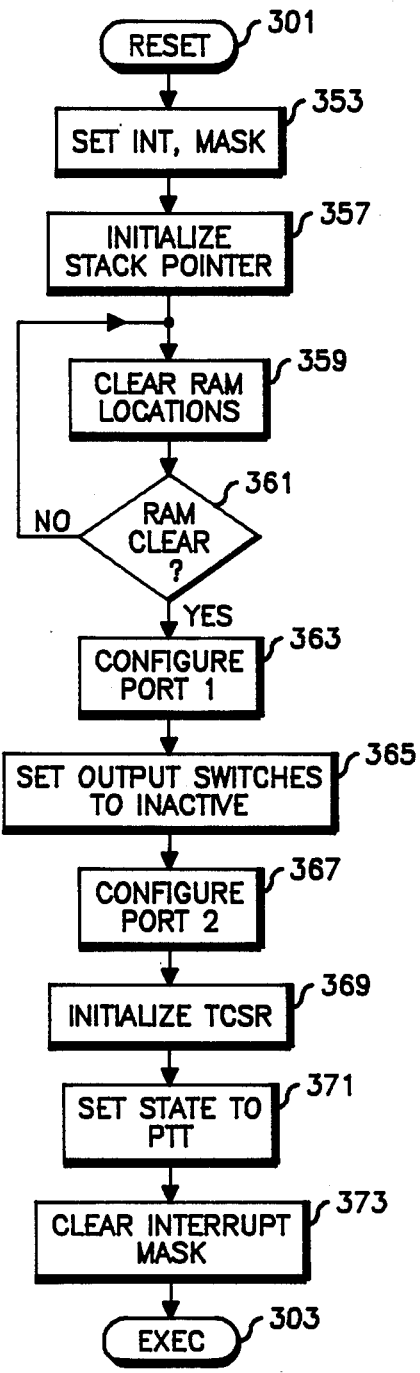

Referring now to FIG. 18, there is shown the reset module 301 of FIG. 17. The reset module 306 initializes the simulcast control module at power-up time. It sets the signalling state to search for line push-to-talk and passes program control to the background EXEC module. The reset module 301 begins with item 353 which sets the microcomputer interrupt mask to prevent interrupt from occurring during the reset power-up sequence. Program control then passes to item 357 which initializes the stack pointer. Item 359 then initializes all the RAM variables in conjunction with decision 361 which continuously clears all RAM locations until every memory location has been cleared. After the RAM variables have been initialized, program control passes to item 357 which defines PIA ports as outputs.

Figure 19:
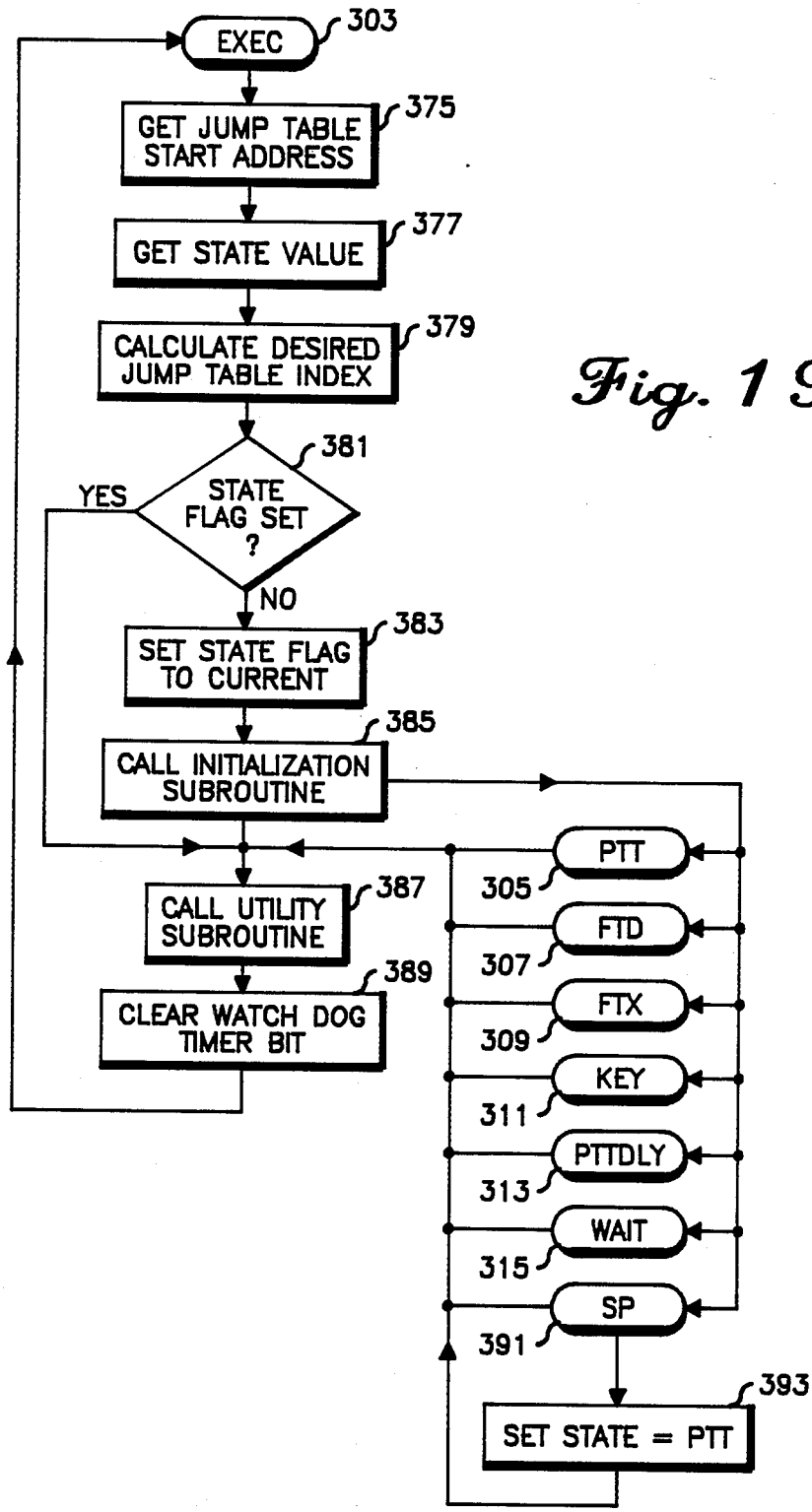

FIG. 19 is a detailed flowchart of the background EXEC module which examines the current state of the individual station control decoder and makes a determination which of the six utility modules should be invoked during the next cycle. EXEC 303 begins with item 375 which examines a memory location which indicates whether EXEC has been previously invoked. Program control proceeds to item 327 which recalls the state variable which defines the current status of the individual station control decoder. Item 379 then calculates which version of the six utility modules should be invoked based on whether the utility module has been previously invoked or not. Decision 381 examines the state variable. If the state variable indicates that the utility has not previously been invoked, program control proceeds to item 383 which updates the state variable to indicate that the utility has been invoked and then proceeds to item 385 which calls initialization subroutine for each of the six utility modules. If the the utility module has been previously invoked, program control will proceed to item 387 which will pass program control to whichever utility subroutine was indicated by the state variable. Item 389 then resets the watchdog timer bit as program control passes to EXEC.

FIG. 20 shows a detailed flow diagram for the PTT utility subroutine 305 shown in FIG. 19. The PTT subroutine module scans the decoder port inputs for a line push-to-talk signal, a local push-to-talk signal or a remote push-to-talk signal as shown in FIG. 16 and sets the CPU state variable to key up the transmitter or to prepare to receive a function tone, i.e., enable the function detector according to the inputs received. The PTT subroutine is a two-pass routine. That is, on the first pass, PTT 305 begins with item 395 which utilizes the ports P14 and P17 as outputs. Then program control returns to the EXEC routine shown in FIG. 19. On the second and subsequent passes, program control will proceed directly to PTT plus 3 (401) in FIG. 9.

FIG. 21 shows a detailed flow diagram for the PTT+3 routine. PTT+3 begins with item 403 which reads the appropriate PTT inputs from the PIA port, and item 405 stores this information in a RAM location. If no activity has been indicated, program control will return to the EXEC subroutine of FIG. 19 through item 409. If activity has been indicated, item 411 generates a 5 ms time delay for the purposes of detecting a switch bounce. Item 413 then reloads the PIA inputs and compares with the values received before the 5 ms delay. If these values do not agree, i.e., if a switch bounce has been detected, decision 415 will pass program control to item 419 which resets the state variable to zero and clears the state flag. Item 419 then passes program control to the background exec module of FIG. 19. If the switch bounce was not detected, decision 417 examines the PIA inputs and decides if the local PTT signal or PTT control signal has been detected. If so, item 421 sets the state variable equal to three, clears the flags and returns program control to the background exec module. If a PTT has not been indicated a line PTT is indicated and, decision 417 passes program control to item 423 which sets the state variable equal to one, clears the flags and returns program control to the background EXEC module 303 of FIG. 19.

Figure 22:
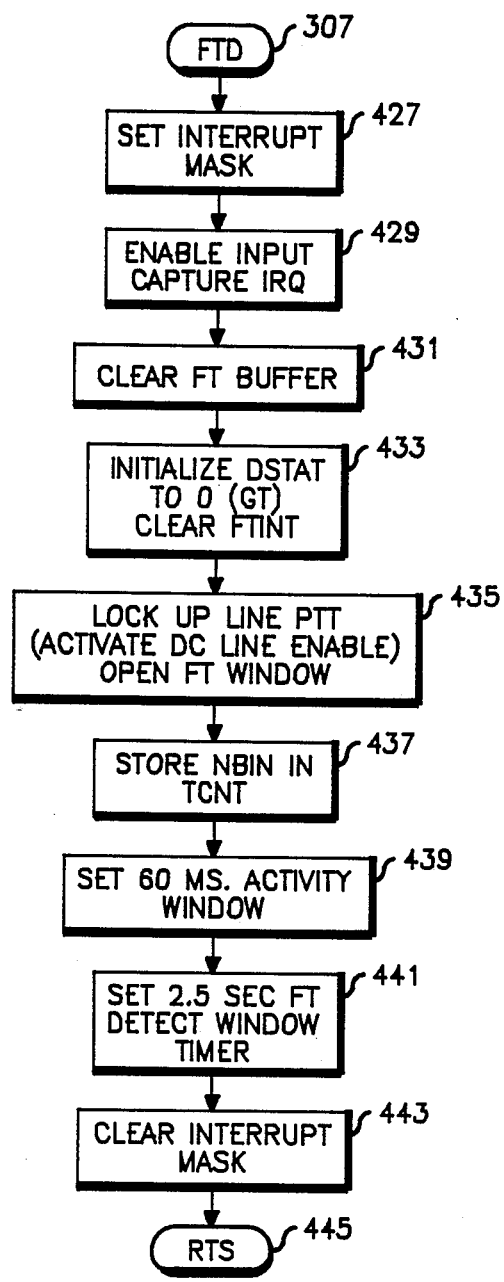

FIG. 22 shows a detailed flow diagram for the function tone detect program module (FTD) 307. This module handles background tests for the function tone decode state which is associated with state one of the state variable. This state is entered into after a high level guardtone has been detected. It enables the function tone decode foreground task and locks down the line push-to-talk signal. The system will stay in this state until a function tone is received. If an invalid tone or a time-out condition occurs, the system will return to the PTT decode state. If a valid tone is received, the system will move on to the function tone execute state which is associated with a value of two for the state variable. The FTD module is also a two-pass subroute. If FTD has not been accessed by the EXEC module earlier, the system will access the first entry point to FTD 307 which begins with item 427 which sets an interrupt mask to prevent an interrupt while FTD is active. Item 429 then enables an internal microprocessor input associated with an internal timer and stores the value of the current timer state. Item 431 then clears the function tone buffer of any existing information while item 433 initializes a tone status word (DSTAT) to zero indicating that guardtone has been received and clears function tone foreground variables which are used to detect the presence of a function tone. Item 435 activates the line push-to-talk control and enables the function tone window control (F) of FIG. 15. Item 437 stores the value of a counter in a RAM location, and the program control proceeds to item 439 which initializes an internal activity timer and passes program control to item 441 which sets the function tone detect window timer. All of the function tone detect variables have been initialized at this point, and item 443 clears the interrupt masks and passes program control back to the background exec module 303 shown in FIG. 19.

DSTAT is generated and updated by a tone decoding foreground routine. This routine places a binary representation of the tone that has been detected in four bits of DSTAT. The routine also sets a valid tone bit and an activity bit based upon preset limit values for detected tones.

Figure 23:
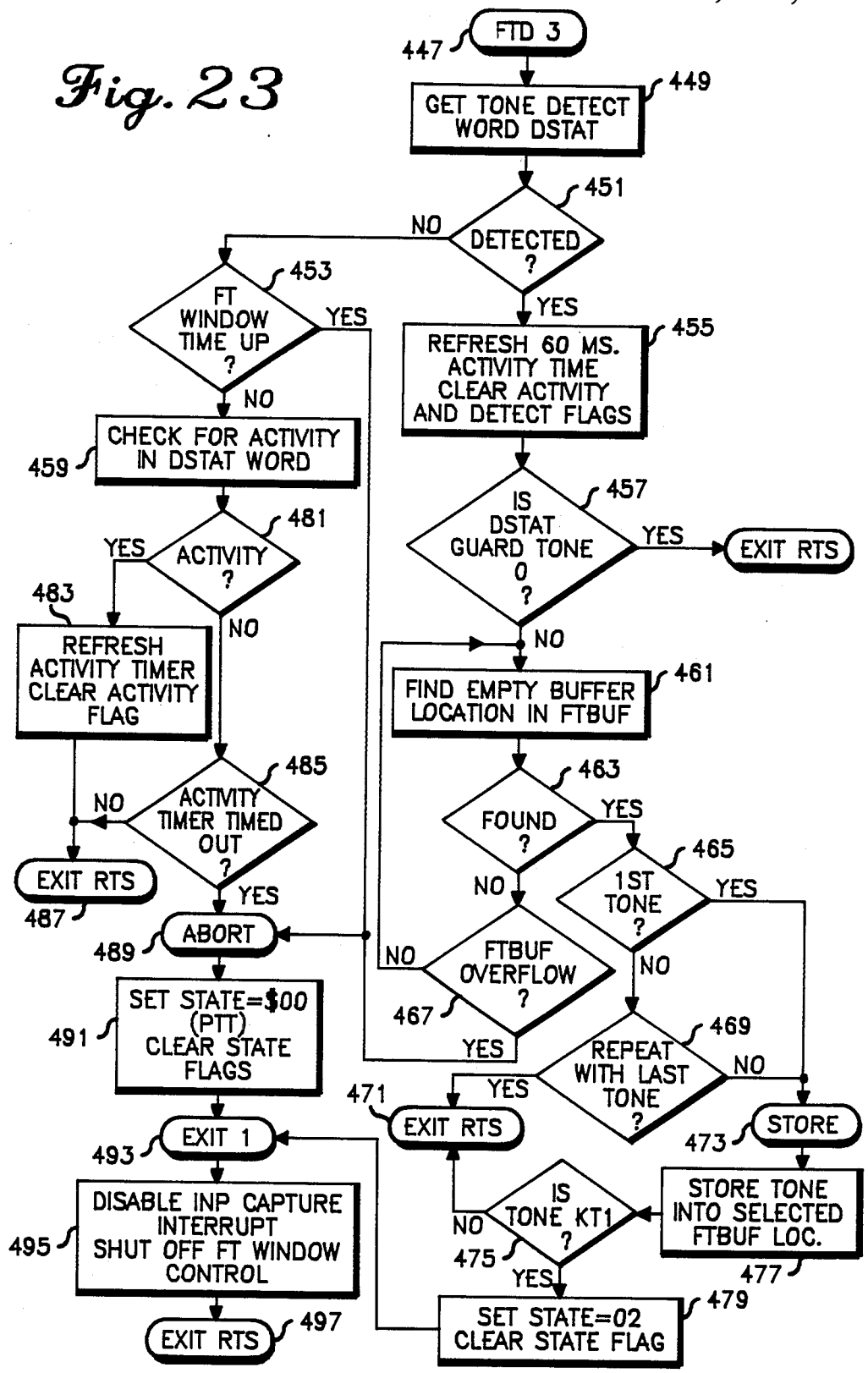

FIG. 23 shows a detailed flow diagram of the FTD+3 utility module which is accessed anytime FTD is indicated by the state variable and FTD has been accessed previously to initialize the FTD variables. FTD+3 447 begins with item 449 which recalls the tone detect status word DSTAT. The tone detect status word DSTAT provides an indication of whether a tone has been detected, as well as containing a binary representation of the tone which has been detected. In other words, every simulcast station decoder is equipped to decode as many as sixteen tones. If one of these tones has been detected, its binary representation will be stored in DSTAT. Once the DSTAT status word has been accessed, program control passes to decision 451 which examines the DSTAT status word. If DSTAT indicates that a tone has been detected, program control proceeds to 455 which refreshes the activity timer and clears the activity and detect flags. Program control then proceeds to decision 457 which examines the DSTAT status. If DSTAT indicates it is guardtone that has been detected, program control returns to the EXEC subroutine. If guardtone has not been detected, item 461 searches for an empty buffer location in the function tone buffer. Decision 463 determines that the function tone buffer has been found. Decision 465 examines the tone stored in the particular FT location. If the tone in the function tone buffer indicates this is the first tone, item 477 stores the tone into a selective function tone buffer location. If the tone is not the first tone decision 465 proceeds to decision 469. Decision 469 examines the tone in the function tone buffer. If a duplication of the previous tone is indicated, then decision 469 passes program control to the background EXEC subroutine shown in FIG. 19. If decision 469 indicates that this is not a duplication with previous tones, then the tone is stored by item 477. Decision 475 examines the tone stored in the function tone buffer location. If a final keying sequence tone is indicated, then program control proceeds to item 479 which updates the state variable, adjusts it for a value of two and clears the state flag. If a keying sequence tone was not indicated, decision 475 returns program control to the EXEC subroutine. Returning to item 479, once the state variable has been updated and the state flag cleared, program control proceeds to the exit subroutine 493.

Returning now to decision 451, if the DSTAT status byte indicates that a tone has not been detected, program control proceeds to decision 453 which examines the function tone time window interval to see if the time for detecting a function tone has elapsed. If the time has not elapsed, program control proceeds to item 459 which checks the DSTAT status word for any new activity. If activity has been detected, decision 481 passes program function tone time window interval to see if the time for detecting a function tone has elapsed. If the time has not elapsed, program control proceeds to item 459 which checks the DSTAT status word for any new activity. If activity has been detected, decision 481 passes program control to item 483 which refreshes the activity timer and clears the activity flag. Program control then returns to the EXEC background subroutine. If activity timer time has elapsed, program control proceeds to item 491 which re-initializes the state variable and clears the state flags and enters the exit subroutine 493. Exit subroutine 493 begins with item 495 which disables the capture interrupt and shuts off the function tone window controls. Program control subsequently reverts to the EXEC background subroutine. Returning now to decision 463, if an appropriate function tone buffer location cannot be found, program control passes to decision 467 which examines the function tone buffer for an overflow indication. If a function tone buffer overflow is indicated, program control passes to the abort subroutine 491 as discussed earlier. If a function tone buffer overflow is not indicated, program control returns to item 461 to continue searching for an empty buffer location in the function tone buffer.

Figure 24A:
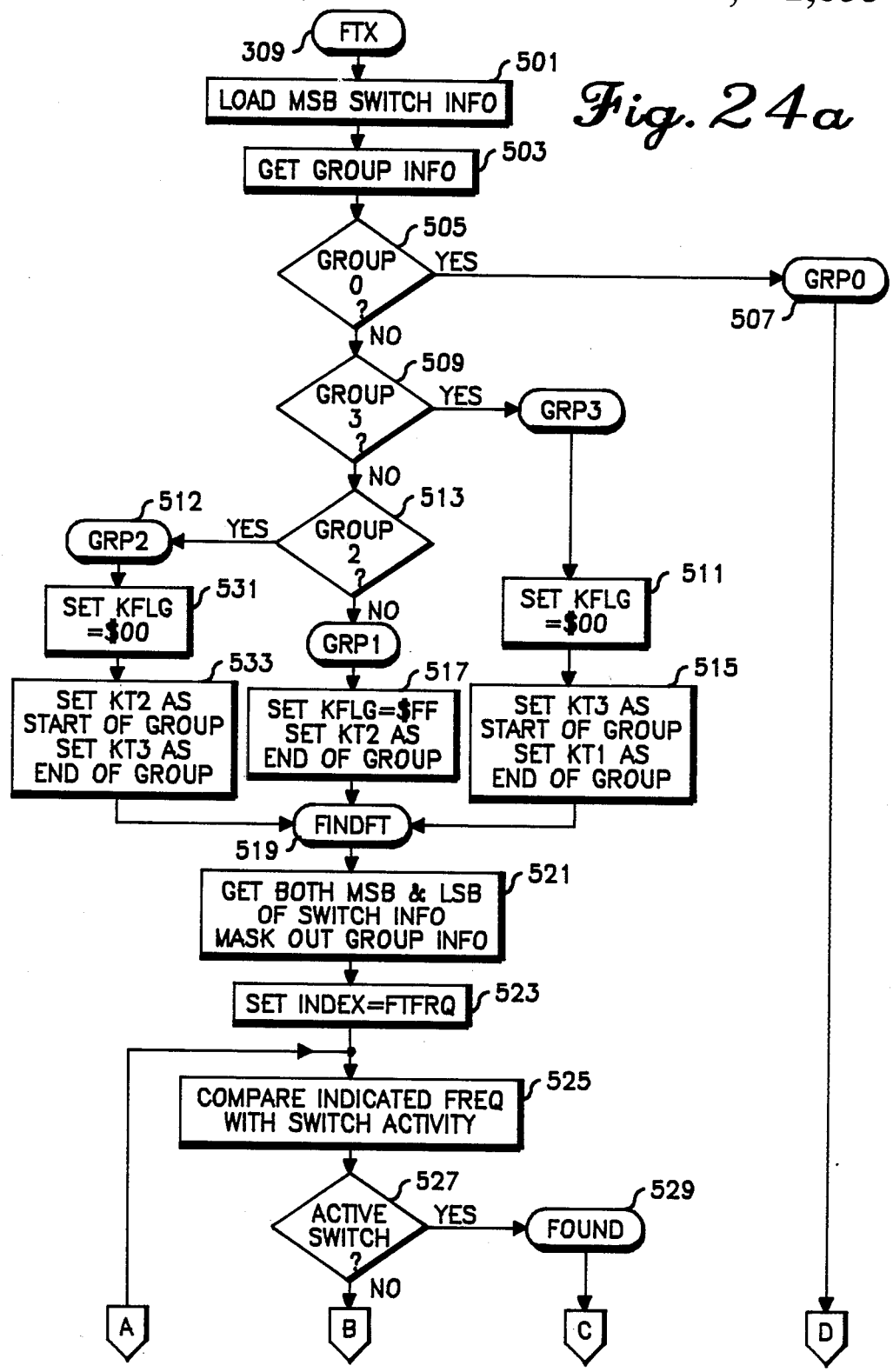

FIGS. 24A and B show the function tone executor module (FTX) 309. The FTX module is invoked by the EXEC background subroutine when the state variable has been set to 2. The function tone detector module causes the state variable to be set to 2 when a valid sequence of function tones is received. Its purpose is to search this stack of function tone numbers and decide whether a valid transmitter knock down tone was decoded in the stack. If so, the transmitter is inhibited, if not, the transmitter is set up for key-up. This module contains a first pass to decide which of the functions tones to look for, and a second pass to find the proper tone numbers.

Figure 24B:
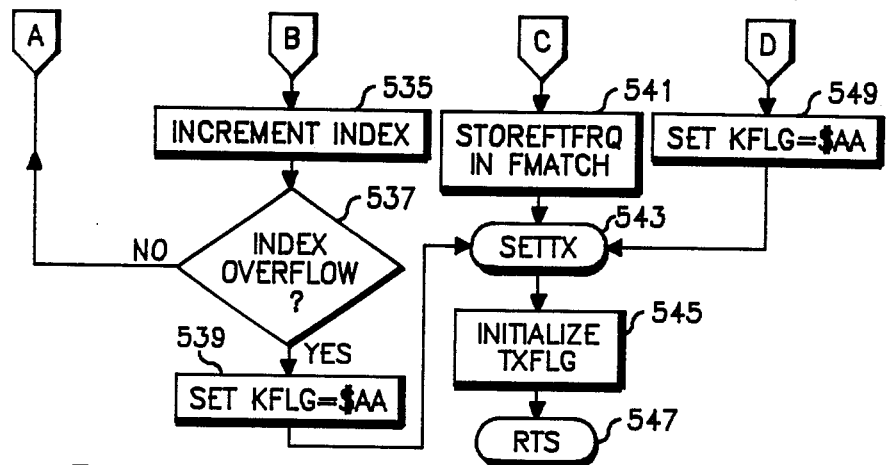

According to FIG. 24A the first time the FTX module is activated, FTX 309 begins with item 501 which reads the simulcast station control decoder programming switches for function tone group information. This information is derived from switches within the simulcast decoder. Item 503 then accesses the group information from the function tone group switches. The program proceeds to decision 505 which examines the group information to determine if the particular simulcast station has been programmed for group 0. If group 0 information has been detected, the group 0 subroutine 507 is invoked. The group 0 subroutine begins with item 549 as shown in FIG. 24B. If group 0 is not detected the program continues to decision 509 which examines the group information to determine whether group 3 information has been programmed into the station control switches. If group 3 information has been detected, the program proceeds to item 511 which resets the group flag information and then selects item 515. Item 515 sets the KT3 keying sequence tone as a start of group tone and sets KT1 as an end of group tone. The program then proceeds to the function tone programmer routine (FINDFT) which begins at 519. Returning now to decision 509, if group 3 information was not detected, the program will proceed to decision 513. If group 2 information is detected, the group 2 subroutine 512 will be invoked and item 531 will set the group flag to zero and proceed to item 533 which will set keying sequence tone 2 (KT2) as a start of group tone and set keying sequence tone 3 (KT3) as an end of group tone. The program will then proceed to the FINDFT routine 519. Returning to decision 513, if group 2 information was not detected, group one is indicated and item 517 will set the group flag byte to $FF and establish keying sequence tone 2 as an end of group tone. The program will then proceed to FINDFT 519.

The function tone programmer subroutine FINDFT begins with item 521. Item 521 loads the function tones information from the paging system decoder switches. Item 523 then sets the function tone frequency index equal to the values indicated in the function tone switch information. Program control proceeds to item 525 which examines the simulcast programming switches for any activity and compares this activity with the indicated frequency. Item 525 examines the first function tone switch that is activated. If an active switch is detected, decision 527 selects the found subroutine 529. If an active switch was not detected, decision 527 will select item 535 which will increment the frequency index for the next function tone frequency. Program then proceeds to item 537. If an index overflow is not indicated, the program will again select item 525. If an index overflow is indicated item 539 will be selected and the group flag will be set to $AA. Item 539 will then select subroutine SETTX 543. SETTX begins with item 545 which will set the transmit flag to $$FF indicating a keyed-up condition which is the normal state for a remote simulcast transmitter unless instructed to de-key. Item 547 will then return to the EXEC background routine shown in FIG. 19. Returning now to decision 527, if switch activity was detected, the found subroutine 529 will be selected which begins with item 541. Item 541 is invoked when an active switch is found. This item will store the tone which has been found in a RAM location FMATCH for matchup with decoded tones which are fetched in the second pass of the FTX module. Item 541 then selects the SETTX routine 543.

Figure 25A:
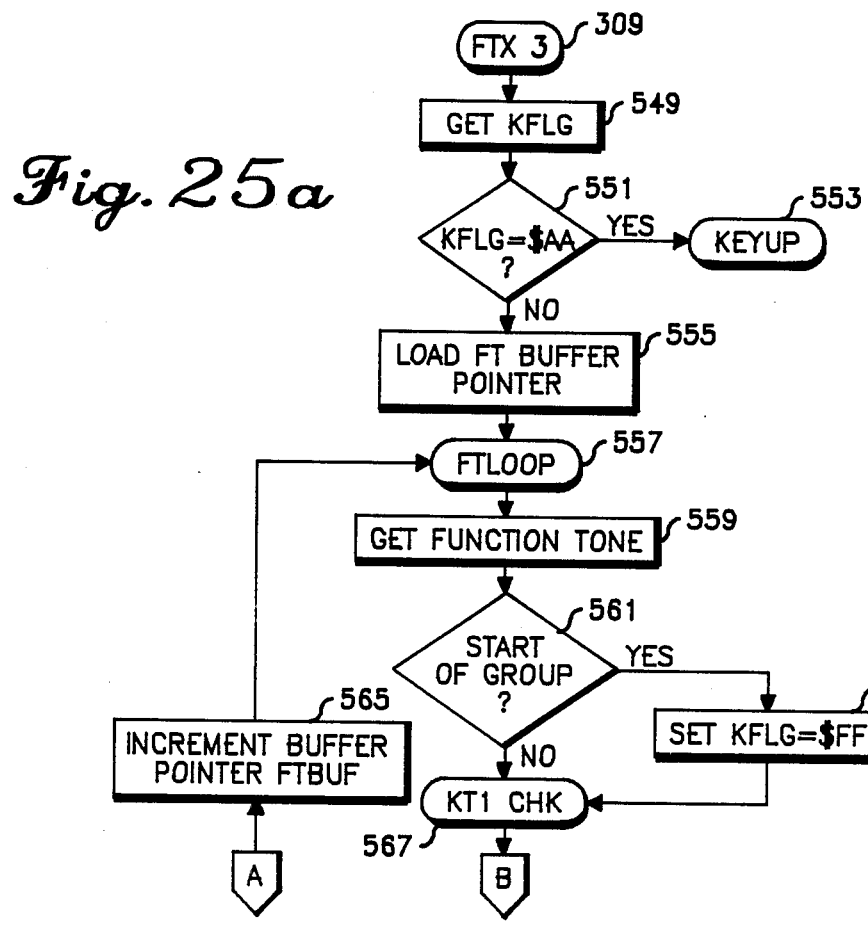
Figure 25B:
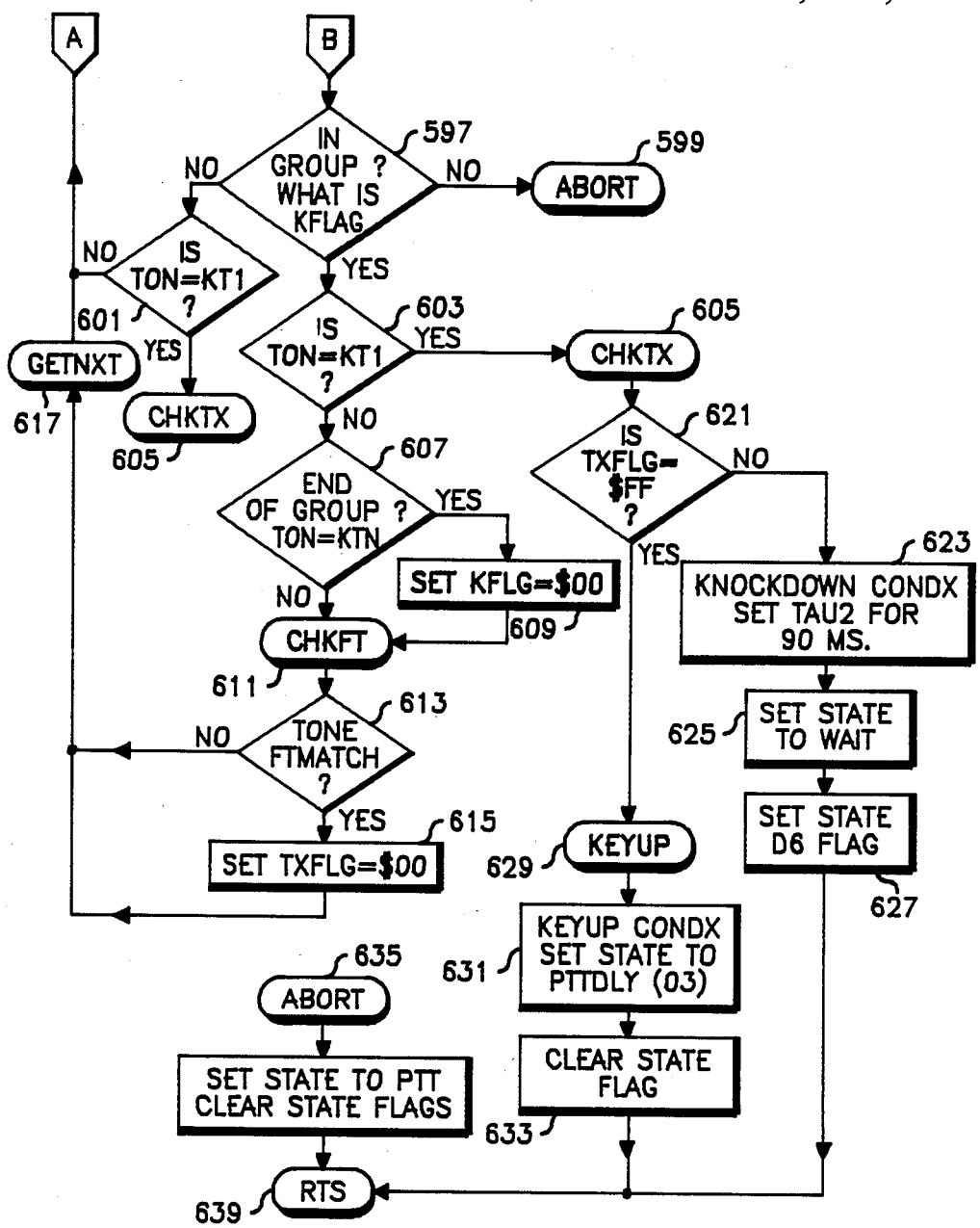

FIGS. 25A and B show a detailed flow diagram for the FTX+3 subroutine which is invoked after the FTX routine has been invoked previously. FTX+3 matches the function tone selected in pass one with one of the tones in the stack received from the FTD module. FTX+3 begins with item 549 which reads the current group flag information. Decision 551 examines the group flag information. If the group flag status byte indicates group zero information, then a transmitter key-up is indicated, and the key-up subroutine 553 will be selected. If group zero information is not indicated in the group flag status plate, decision 551 will select item 555 which loads the current's function tone buffer pointer to the start of the function tone stack to search for the proper group and knock-down tones. The program then enters the function tone loop 557 which begins with item 559 which begins by selecting the first function tone. The program proceeds to item 561 which examines the first function tone to determine if start of group tone has been detected. If a group start tone has been detected, the program will select item 563 which will reset the group flag status byte to $FF and select the keying sequence tone one check routine 567. If a start of group tone has not been detected, item 561 will directly select the keying sequence tone one check routine 567. Keying sequence tone check routine 567 shown in FIG. 13B begins with decision 597. Decision 597 examines the group flag to determine if the keying sequence tone detected is in the desired programming group. If the group tone detected is equal to $AA, the program will proceed to the ABORT subroutine 599 or return program control to item 565 based on the condition of the group flag. If the group tone detected was in the desired group, decision 603 examines the tone to see if the final keying sequence tone has been detected. If keying sequence tone one has been detected, decision 603 will select subroutine check-transmit 605 which begins with decision 621. If keying sequence tone one was not detected, the program will proceed to decision 607 which examines the group tone to determine if an end-of-group tone has been detected. If an end-of-group tone has been detected, decision 607 will select item 609 which resets the group flag $00 and selects the check function tone subroutine 611. If an end-of-group tone has not been detected, decision 607 will directly select the CHKFT subroutine 611. The check function tone subroutine begins with decision 613 which examines the detected function tone to determine if a function tone match exists. If a function tone match has not been detected, decision 613 will select the get next (GETNXT) subroutine 617 which returns program control to item 565 in FIG. 25A. If a function tone match has been detected, item 615 will be selected and the transmit flag will be reset to $00. Returning now to the check transmit subroutine 605, decision 621 examines the transmit flag to determine if a $FF condition exists. If this condition does not exist, item 623 will instruct the simulcast transmitter that a knock-down condition exists and sets the DC line disable for 90 ms. Item 625 will then set the state variable for a wait condition and item 627 will reset the state flag D6. State flag D6 is used in the wait 3 subroutine (315A) of FIG. 27b to indicate the origin of entry as FTX for service of PTTDLY on DC line disable. Program control will then return to the background EXEC subroutine shown in FIG. 19. Returning to decision 621, if a transmit flag equal to $FF condition does exist, the key-up routine 629 will be selected. The Key-up 629 begins with item 631 which adjusts the system state variable to indicate the PTTDLY routine should be selected. Item 633 then clears the state flag and returns program control to the background EXEC subroutine of FIG. 19. Returning now to decision 597, depending on the condition of the group flag variable decision 597 could alternately select decision 601 if the beginning of group tone (KFLAG=$00) has not been detected. Decision 601 would then check to see if the final keying sequence tone was detected. If not, GETNXT routine 617 will be selected. If the final keying sequence tone one was detected, the check-transmit subroutine 605 will be selected.

FIGS. 26A and 26B show a detailed flow diagram for the line PTT lockup delay handler module 313 and 313A. This module is activated when the state variable has been set to 4 and provides delay between the receipt of a keying sequence one tone by the simulcast paging system control decoder in the event of unlocking line PTT. This delay is 90 milliseconds and is needed to prevent the loss of line PTT during the silent period between keying sequence tone 1 and the binary transitions in a binary paging keying sequence. It invoked by the FTX module if the keying sequence tone 1 is received and the transmitter is not disabled. If PTT has not been selected during a prior intervale the EXEC routine will select PTT delay 313 since the PTT delay routine does not require the initialization of any variables PTT delay 313 immediately returns program control to the EXEC subroutine. If PTT has been selected earlier when the state variable has been set to 4 the EXEC routine will select PTT DLY3 313A which begins with item 569 which immediately sets the state variable equal to 3 and sets the state flag. The program proceeds to item 571 which sets the timer to generate a 90 millisecond time interval and than subsequently returns program control to the EXEC background subroutine shown in FIG. 19.

FIGS. 27A and 27B show detailed flow diagrams for the paging system decoder key-up handler routine (KEY). This module keys the simulcast station provided the keyed A+ delay is active. Once keyed, the module exits to the wait state for as long as A+ delay is present. The key state is invoked if local PTT or remote PTT or a valid keying tone is detected by other modules. If the key module has not been previously invoked the EXEC routine will select Key routine 311 since the Key routine does not require initialization of variables key routine 311 immediately returns program control the EXEC routine. If the key routine has been previously addressed, the EXEC routine will select the Key 3 subroutine 311A which begins with item 575. Item 575 reads the value of the delayed keyed A+ flag P13 from port 1. Program control proceeds to decision 577 which examines the delayed keyed A+ flag. If the flag is active, program control proceeds to the GO subroutine 581. If the flag is not active, program control proceeds to item 579 which generates a 5 millisecond time delay. Program control proceeds to item 89 which selects delayed key A+ flag. Decision 591 examines the flag if the flag is active it will pass to the GO routine 581. If the flag is still not active, decision 591 will select item 593 which sets the state variable to 0, clears the state flag, and resets the function tone window control and the DC line disable. Item 593 then passes program control to the EXEC subroutine 303 shown in FIG. 19. Referring now to the go routine 581, item 583 activates the transmitter oscillator ground by grounding output P16. The program then proceeds to item 585 which sets the state variable equal to 5 to access the weight utility module. Item 587 then resets system D6 status flag, and returns program control to the background EXEC routine 303.

Figure 28A:
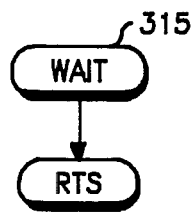
Figure 28B:
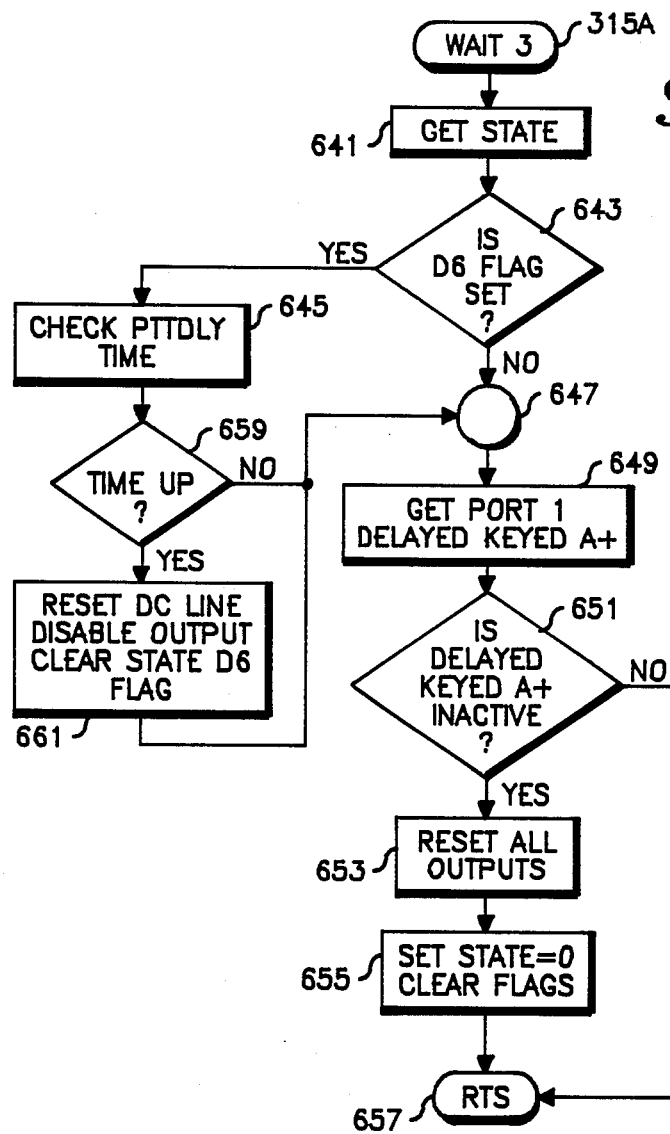

FIGS. 28A and 28B are detailed flow diagrams of the paging system decoder wait de-key handler utility module. This module provides the paging system decoder de-key function when the appropriate signal is received from hardware. While waiting for the de-key signal it also unlocks the line push-to-talk after an appropriate time. This module is invoked by a valid transmitter key-up. FIG. 28A shows the wait routine which is accessed by the EXEC module, if the wait routine has not been previously accessed. Since this routine does not require the initialization of variables, WAIT routine 315 returns program control to the EXEC background routine 303. If wait has been previously addressed, the EXEC module will select WAIT 3 routine 315A as shown in FIG. 28B. Wait 3 begins with item 641 which checks the state flag variable D6 for a valid indication of a keying sequence tone. If a valid keying sequence tone has been detected decision 643 will select item 645. If the keying sequence tone status bit D6 has not been set, program control will pass to item 649 which checks port 1 pin 13 for delayed keyed A+ activity. If delayed keyed A+ signal has been inactive, decision 651 passes program control to items 653 and 655 which reset all outputs and returns rogram control to the EXEC subroutine. If activity was detected at P13 program control immediately passes from decision 651 to the EXEC subroutine 303 of FIG. 19. Returning now to decision 643. If D6 flag of the status byte was set item 645 will be selected which checks the PTT delayed timer for current value. Decision 659 then passes program control to item 649 if the time has not elapsed, program control is passed to item 661 which resets DC line disable outputs clears the state flag D6 and then returns program control to item 649. The state flag D6 is set by the PTT delay module which sets the DC line disable timer that indicates to this module that a key up was indicated by a valid keying tone 1 tone detect. The flag is cleared after a PTT delayed time out.

In summary a paging simulcast remote control system capable of controlling a paging base station in response to a predetermined signalling scheme has been described. Although the invention has been described in terms of a preferred embodiment it will be obvious to those skilled in the art that many modifications and alterations may be made departing from the invention. Accordingly, it is intended that all such modifications and alterations be considered as within the spirit and scope of the invention as defined by the appended claims.

What is claimed is:

1. A remote control system for selective control of particular transmitters in a simulcast transmission system, said system receiving signals from a paging terminal and combining paging information with transmitter control information, said remote control system comprising:
   (a) encoding means for encoding transmitter control information and paging information in a predetermined sequence, wherein said transmitter control information comprises a series of transmitter inhibit tones;
   (b) linking means coupled to said encoding means for transferring said encoded information from said encoding means;
   (c) individual decoding means, located at each particular transmitter, coupled to said linking means for decoding said encoded transmitter control information, said decoding means detecting the presence of said series of transmitter inhibit tones and generating a disabling transmitter control signal in response thereto; and
   (d) transmitter means coupled to said decoding means for transmitting said encoded paging information, wherein said transmitter is further responsive to said disabling transmitter control signal for inhibiting the transmission of said encoded paging information if said control signal is present.

2. The remote control system of claim 1 wherein said encoded paging information, and said transmitter control information are transmitted over a common linking channel.

3. The remote control system of claim 1 wherein said linking means is an RF transmitter and receiver.

4. The remote control system of claim 1 wherein said linking means is a conventional terrestial wire line link.

5. The remote control system of claim 1 wherein said predetermined sequence comprises a transmitter initialization tone, a series of transmitter control tones comprising individual transmitter control information, followed by encoded paging information wherein said encoded paging information includes a low level control signal which accompanies analog modulation, the absence of which will cause the particular transmitters to turn off so that positive station control is maintained.

6. The apparatus of claim 1 wherein said encoder means further includes a plurality of switches wherein said switches cause said encoder to generate a signalling sequence designating a particular transmitter to be disabled.

7. A method for selective control of particular transmitters in a transmission system by receiving signals from a paging terminal and combining paging information with transmitter control information, said method comprising the steps of:
   (a) encoding at encoding means paging information and transmitter control information in a predetermined sequence comprising encoded information, said transmitter control information comprising a series of transmitter inhibit tones;
   (b) transferring said encoded information from said encoding means to a decoding means located at particular transmitters via linking means;
   (c) decoding at said decoding means said transmitter control information, and detecting the presence of a particular transmitter inhibit tone corresponding to a particular transmitter associated with said decoding means and generating a disabling transmitter control signal in response to detection thereof; and
   (d) transmitting paging information if said disabling transmitter control signal is not present or inhibiting transmission of paging information if said disabling transmitter control signal is present.

* * * * *